US012640820B1

(12) United States Patent
Ardalan

(10) Patent No.: US 12,640,820 B1
(45) Date of Patent: May 26, 2026

(54) OPTICAL INTERCONNECT SYSTEM, METHOD AND DEVICE

(71) Applicant: LuxSemi Inc., San Jose, CA (US)

(72) Inventor: Shahab Ardalan, San Jose, CA (US)

(73) Assignee: LuxSemi Inc., San Jose, CA (US)

( * ) Notice: Subject to any disclaimer, the term of this patent is extended or adjusted under 35 U.S.C. 154(b) by 267 days.

(21) Appl. No.: 18/667,821

(22) Filed: May 17, 2024

Related U.S. Application Data

(60) Provisional application No. 63/467,316, filed on May 18, 2023, provisional application No. 63/467,315, filed on May 18, 2023, provisional application No. 63/467,318, filed on May 18, 2023.

(51) Int. Cl.
*H04B 10/80* (2013.01)
*G02B 6/43* (2006.01)
*H04B 10/40* (2013.01)

(52) U.S. Cl.
CPC ............. *H04B 10/801* (2013.01); *G02B 6/43* (2013.01); *H04B 10/40* (2013.01)

(58) Field of Classification Search
None
See application file for complete search history.

(56) References Cited

U.S. PATENT DOCUMENTS

| | | | | | |
|---|---|---|---|---|---|
| 6,567,963 | B1 * | 5/2003 | Trezza | ..................... | G02B 6/43 |
| | | | | | 716/118 |
| 8,231,284 | B2 * | 7/2012 | Doany | ..................... | G02B 6/43 |
| | | | | | 385/33 |

| | | | | | |
|---|---|---|---|---|---|
| 8,536,512 | B2 * | 9/2013 | Shiraishi | .............. | H05K 1/0274 |
| | | | | | 250/227.24 |
| 8,559,474 | B2 * | 10/2013 | Andry | ................... | H10F 39/107 |
| | | | | | 372/50.23 |
| 8,837,890 | B2 * | 9/2014 | Bickham | ............ | G02B 6/03627 |
| | | | | | 385/124 |
| 9,645,316 | B1 * | 5/2017 | Hasharoni | ................ | G02B 6/32 |
| 9,869,829 | B2 * | 1/2018 | Bowen | ................ | G02B 6/3636 |
| 10,054,737 | B2 * | 8/2018 | Kobrinsky | ......... | G02B 6/12004 |
| 10,177,841 | B2 * | 1/2019 | Mentovich | ........... | H04B 10/506 |
| 10,365,447 | B2 * | 7/2019 | Mekis | .................... | G02B 6/428 |
| 10,436,991 | B2 * | 10/2019 | Jou | ....................... | G02B 6/4279 |
| 10,522,977 | B1 * | 12/2019 | Mentovich | .............. | H01S 5/423 |
| 11,002,926 | B1 * | 5/2021 | Mathai | ................. | G02B 6/4206 |
| 11,822,138 | B2 * | 11/2023 | Kalman | .................. | G02B 6/43 |
| 11,835,777 | B2 * | 12/2023 | Winterbottom | ...... | G02B 6/4295 |
| 12,101,128 | B2 * | 9/2024 | Pezeshki | ........... | G02B 6/02042 |
| 12,140,810 | B2 * | 11/2024 | Patra | .................... | G02B 6/4249 |
| 2002/0025100 | A1 * | 2/2002 | Laprise | ............ | G01R 31/31728 |
| | | | | | 385/14 |

(Continued)

*Primary Examiner* — Jai M Lee
(74) *Attorney, Agent, or Firm* — Haverstock & Owens, A Law Corporation

(57) ABSTRACT

An optical-electrical integrated circuit system, method and device for optically coupling together a plurality of integrated circuits. Specifically, the system, method and device includes a waveguide network within an optical interface layer of a package, wherein the network optically interfaces with surface emitting light sources and photodetectors. Electrical signals received from the integrated circuits by the light sources are converted to optical signals and transmitted through the network to the photodetectors which convert the optical signals back into electrical signals that are forwarded to the receiving integrated circuit.

39 Claims, 9 Drawing Sheets

(56)     References Cited

U.S. PATENT DOCUMENTS

| | | | |
|---|---|---|---|
| 2018/0024292 A1* | 1/2018 | Beausoleil | G02B 6/30 |
| | | | 385/14 |
| 2022/0276455 A1* | 9/2022 | Rubinstein | G02B 6/12004 |
| 2023/0367085 A1* | 11/2023 | Kim | G02B 6/4292 |
| 2024/0097796 A1* | 3/2024 | Winzer | H04B 10/503 |
| 2025/0035865 A1* | 1/2025 | Romero Garcia | H10F 30/223 |

* cited by examiner

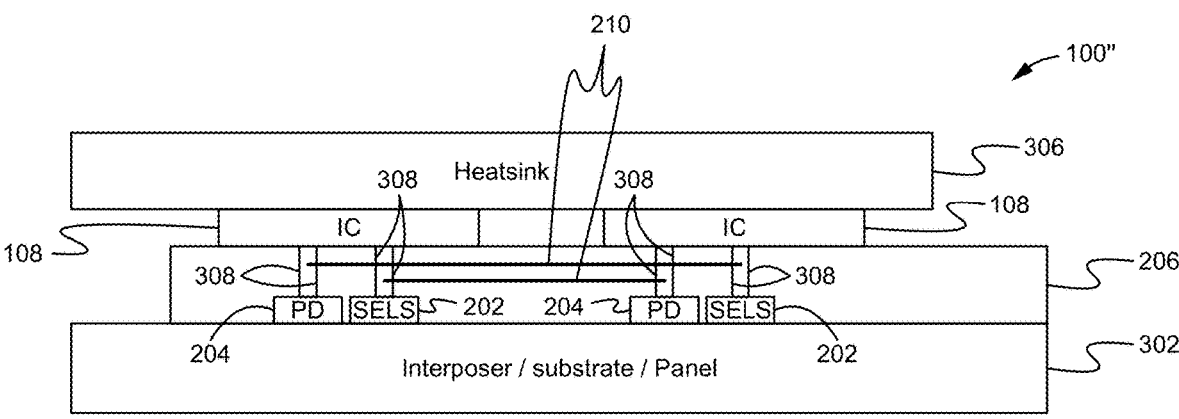
Fig. 4
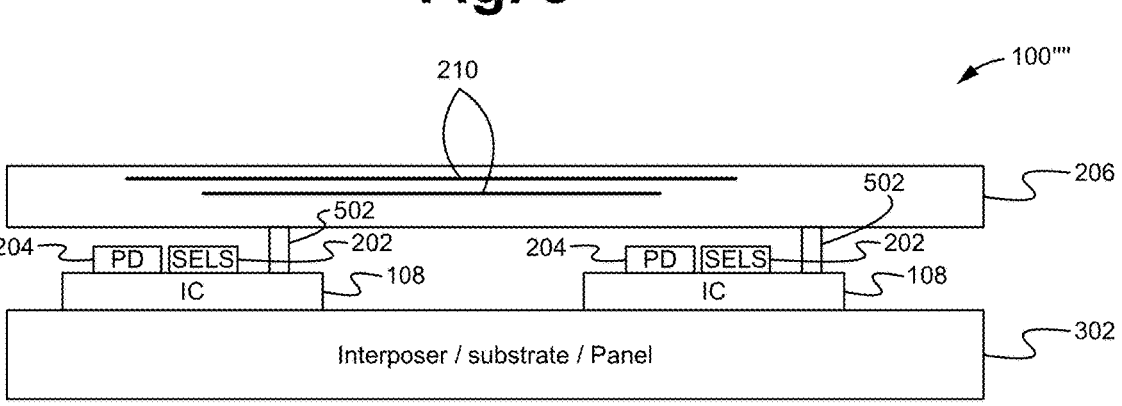
Fig. 5
Fig. 6

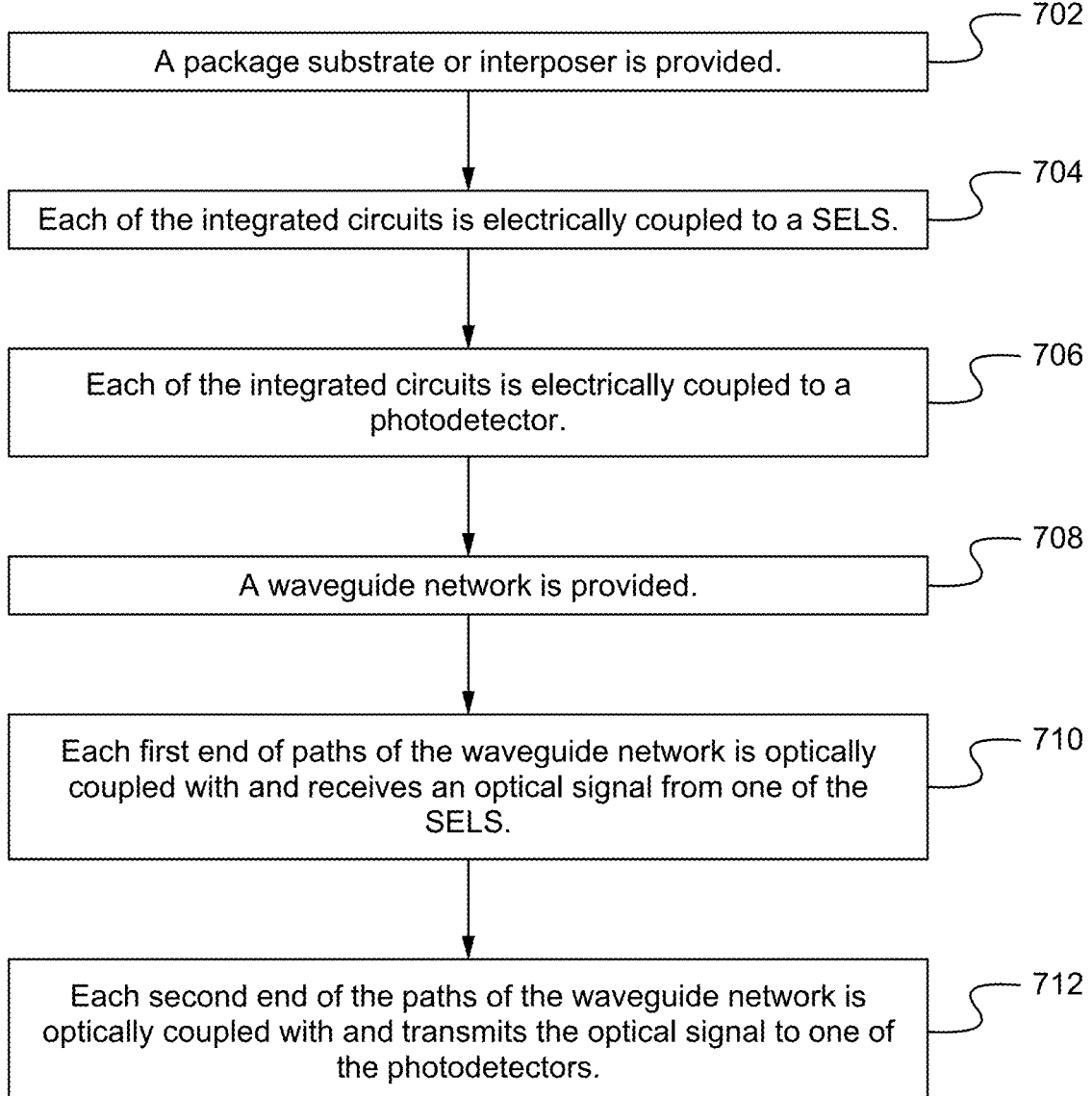

702
A package substrate or interposer is provided.

704
Each of the integrated circuits is electrically coupled to a SELS.

706
Each of the integrated circuits is electrically coupled to a photodetector.

708
A waveguide network is provided.

710
Each first end of paths of the waveguide network is optically coupled with and receives an optical signal from one of the SELS.

712
Each second end of the paths of the waveguide network is optically coupled with and transmits the optical signal to one of the photodetectors.

Fig. 7

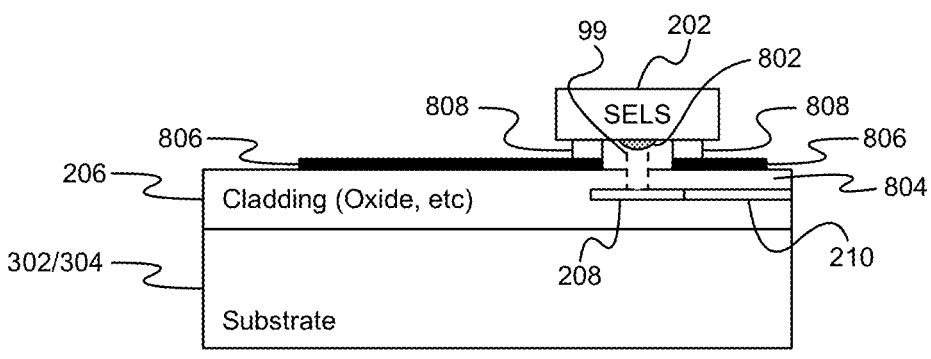
Fig. 8D
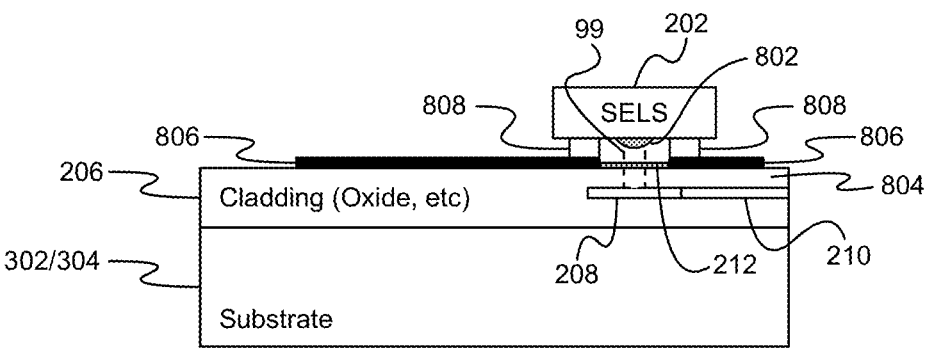
Fig. 8E
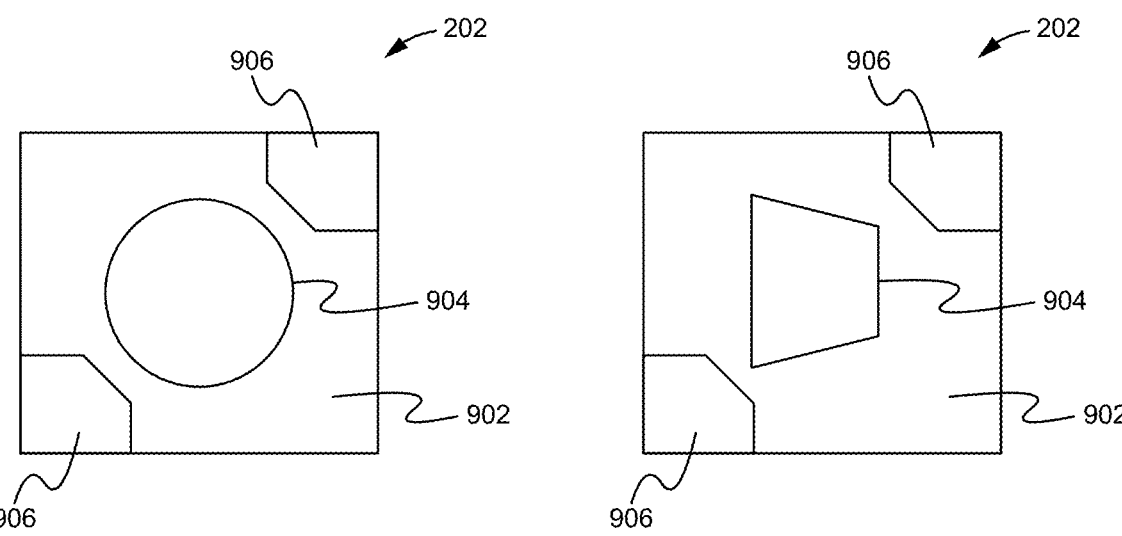
Fig. 9A          Fig. 9B

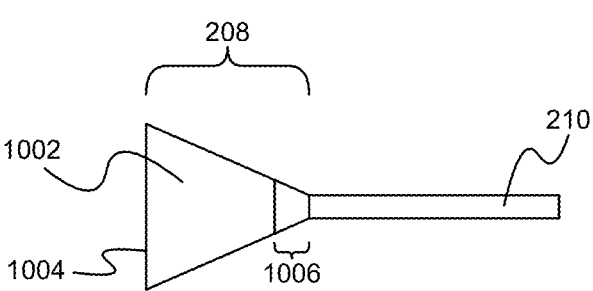

Fig. 10

| |
|---|
| Electrically coupling one or more ICs with a SELS — 1102 |

↓

| |
|---|
| Providing a waveguide network — 1104 |

↓

| |
|---|
| Optically coupling the first end of an optical path of the waveguide network with the SELS via an optical coupler — 1106 |

↓

| |
|---|
| Receiving an electrical signal from one of the ICs — 1108 |

↓

| |
|---|
| Converting the electrical signal to an optical signal and outputting the optical signal from a bottom aperture of the SELS — 1110 |

↓

| |
|---|
| Receiving the optical signal from a first direction with the optical coupler and routing the optical signal into the first end of the waveguide path in a second direction — 1112 |

Fig. 11

OPTICAL INTERCONNECT SYSTEM, METHOD AND DEVICE

RELATED APPLICATIONS

This application claims priority under 35 U.S.C. § 119(e) of the U.S. provisional patent application Ser. No. 63/467,315, filed May 18, 2023, and titled "WAFER/PANEL LEVEL OPTICAL LINK," the U.S. provisional patent application Ser. No. 63/467,318, filed May 18, 2023, and titled "METHODS FOR CONNECTING ASICS ON A PCBS OR SILICON WAFERS USING PASSIVE OPTICAL LINKS," and the U.S. provisional patent application Ser. No. 63/467,316, filed May 18, 2023, and titled "METHODS FOR COUPLING MULTIMODE LIGHT SOURCE VERTICALLY TO INTEGRATED WAVEGUIDES," all which are hereby incorporated by reference.

FIELD OF INVENTION

The present invention relates to optical interconnects. More particularly, the present invention relates to optical interconnects for coupling two or more integrated circuits on wafers, panels or other substrates.

BACKGROUND OF THE INVENTION

Large computing systems typically use an architecture where computing and memory resources are tightly coupled to maximize performance. Components such as central processing units (CPUs), graphics processing units (GPUs), and memory must be placed closely together when connected electrically via copper interconnects. This hardware density results in cooling and energy issues, while persistent bandwidth bottlenecks limit inter-processor and memory performance. These issues are further exacerbated in compute-intensive applications like high-performance computing (HPC), artificial intelligence (AI), and compute-intensive data analytics.

BRIEF SUMMARY OF THE INVENTION

An optical-electrical integrated circuit system, method and device including an optical architecture including a waveguide network, one or more surface emitting light sources and one or more photodetectors that altogether optically couple together two or more integrated circuits or microchips of an electrical architecture. As a result, the optical interconnect/interposer system, method and device provides the advantage of lowering power demands by utilizing power efficient optical components, optically extending electrical channel reach and lessening hardware density issues (e.g. power, heat, space) by using optical networks to extend electrical endpoints, and enabling wafer and/or panel level optical interconnection.

A first aspect is directed to an integrated circuit system. The system comprises a package substrate providing structural support to the system, a plurality of application specific integrated circuits (ASICs), a plurality of surface emitting light sources (SELS), a plurality of photodetectors, wherein each of the ASICs is electrically coupled with at least one of the SELS and at least one of the photodetectors for transmitting and receiving electrical signals to the at least one of the SELS and from the at least one of the photodetectors, and a waveguide network including a plurality of waveguide paths that each optically guide light between a first end of the path a second end of the path, wherein each of the first ends is optically coupled with a different one of the SELS for receiving an optical signal from the different one of the SELS and each of the second ends is optically coupled with a different one of the photodetectors for transmitting the optical signal to the different one of the photodetectors.

In some embodiments, the SELS convert the electrical signals received from the ASICs to the optical signals transmitted to the first ends and the photodetectors convert the optical signals received from the second ends to the electrical signals transmitted to the ASICs. In some embodiments, the SELS comprise one or more of micro light emitting diodes and vertical cavity surface emitting lasers. In some embodiments, the photodetectors are normal incident photodetectors. In some embodiments, the waveguide network is formed by one of silicon nitride and a polymer. In some embodiments, the waveguide network comprises a plurality of horizontal layers that each include a plurality of the waveguide paths extending from one location in the layer proximate one of the ASICs to another location within the layer proximate another of the ASICs. In some embodiments, the first ends and the second ends of the waveguide paths each comprise one of a group consisting of a grating coupler and a 45 degree mirror for receiving the optical signal into and transmitting the optical signal out of the waveguide path.

In some embodiments, the optical signal is multimodal and the system further comprises one or more polarization filters positioned between each of the first ends and the different one of the SELS optically coupled with the first end for filtering the optical signals output by the SELS before the optical signals are received by the first ends. In some embodiments, the optical signal is multimodal and the waveguide network is multimodal for transporting each mode of the optical signals. In some embodiments, an additional substrate is formed on the package substrate, the waveguide network is formed on top of the additional substrate and the ASICs, photodetectors and SELS are coupled to a top of the waveguide network via a flip chip type coupling. In some embodiments, the waveguide network is formed on top of the package substrate, the photodetectors and SELS are positioned within the waveguide network adjacent to the package substrate and the ASICs are coupled to a top of the waveguide network opposite the package substrate. In some embodiments, the waveguide network is formed on top of the package substrate, the ASICs are positioned within the waveguide network adjacent to the package substrate and the photodetectors and the SELS are coupled to a top of the waveguide network opposite the package substrate. In some embodiments, the ASICs are positioned on top of the package substrate, the photodetectors and the SELS are positioned on top of the ASICS and the waveguide network is positioned proximate the photodetectors and the SELS opposite the top of the ASICs, and further wherein there is a gap between the waveguide network and the photodetectors and the SELS.

Another aspect is directed to an optical interconnect. The optical interconnect comprises a plurality of application specific integrated circuits (ASICs), a plurality of surface emitting light sources (SELS), a plurality of photodetectors, wherein each of the ASICs is electrically coupled with at least one of the SELS and at least one of the photodetectors for transmitting and receiving electrical signals to the at least one of the SELS and from the at least one of the photodetectors and a waveguide network including a plurality of waveguide paths that each optically guide light between a first end of the path a second end of the path, wherein each of the first ends is optically coupled with a different one of the SELS for receiving an optical signal from the different one of the SELS and each of the second ends is optically coupled with a different one of the photodetectors for transmitting the optical signal to the different one of the photodetectors.

In some embodiments, the SELS convert the electrical signals received from the ASICs to the optical signals transmitted to the first ends and the photodetectors convert the optical signals received from the second ends to the electrical signals transmitted to the ASICs. In some embodiments, the SELS comprise one or more of micro light emitting diodes and vertical cavity surface emitting lasers. In some embodiments, the photodetectors are normal incident photodetectors. In some embodiments, the waveguide network is formed by one of silicon nitride and a polymer. In some embodiments, the waveguide network comprises a plurality of horizontal layers that each include a plurality of the waveguide paths extending from one location in the layer proximate one of the ASICs to another location within the layer proximate another of the ASICs. In some embodiments, the first ends and the second ends of the waveguide paths each comprise one of a group consisting of a grating coupler and a 45 degree mirror for receiving the optical signal into and transmitting the optical signal out of the waveguide path. In some embodiments, the optical signal is multimodal and the interconnect further comprises one or more polarization filters positioned between each of the first ends and the different one of the SELS optically coupled with the first end for filtering the optical signals output by the SELS before the optical signals are received by the first ends.

In some embodiments, the optical signal is multimodal and the waveguide network is multimodal for transporting each mode of the optical signals. In some embodiments, the ASICs, photodetectors and SELS are coupled to a top of the waveguide network via a flip chip type coupling. In some embodiments, the photodetectors and SELS are positioned within the waveguide network abutting a bottom of the waveguide network and the ASICs are coupled to a top of the waveguide network opposite the bottom. In some embodiments, the ASICs are positioned within the waveguide network abutting a bottom of the waveguide network and the photodetectors and the SELS are coupled to a top of the waveguide network opposite the bottom. In some embodiments, the photodetectors and the SELS are positioned on top of the ASICs, the waveguide network is positioned proximate the photodetectors and the SELS opposite the top of the ASICs, and there is a gap between the waveguide network and the photodetectors and the SELS.

Another aspect is directed to a method of implementing an integrated circuit system. The method comprises providing a package substrate, electrically coupling each of a plurality of application specific integrated circuits (ASICs) with at least one of a plurality of surface emitting light sources (SELS) for transmitting electrical signals to the at least one of the SELS, electrically coupling each of the plurality of ASICs with at least one of a plurality of photodetectors for receiving the electrical signals from the at least one of the photodetectors, providing a waveguide network including a plurality of waveguide paths that each optically guide light between a first end of the path a second end of the path, optically coupling each of the first ends with a different one of the SELS for receiving an optical signal from the different one of the SELS and optically coupling each of the second ends with a different one of the photodetectors for transmitting the optical signal to the different one of the photodetectors.

In some embodiments, the method further comprises converting the electrical signals received from the ASICs to the optical signals transmitted to the first ends with the SELS and converting the optical signals received from the second ends to the electrical signals transmitted to the ASICs with the photodetectors. In some embodiments, the SELS comprise one or more of micro light emitting diodes and vertical cavity surface emitting lasers. In some embodiments, the photodetectors are normal incident photodetectors. In some embodiments, the waveguide network is formed by one of silicon nitride and a polymer. In some embodiments, the waveguide network comprises a plurality of horizontal layers that each include a plurality of the waveguide paths extending from one location in the layer proximate one of the ASICs to another location within the layer proximate another of the ASICs. In some embodiments, the first ends and the second ends of the waveguide paths each comprise one of a group consisting of a grating coupler and a 45 degree mirror for receiving the optical signal into and transmitting the optical signal out of the waveguide path.

In some embodiments, the optical signal is multimodal and the method further comprises filtering the optical signals output by the SELS before the optical signals are received by the first ends by positioning one or more polarization filters between each of the first ends and the different one of the SELS optically coupled with the first end. In some embodiments, the optical signal is multimodal and the waveguide network is multimodal for transporting each mode of the optical signals. In some embodiments, the method further comprises forming an additional substrate on the package substrate, forming the waveguide network on top of the additional substrate and coupling the ASICs, photodetectors and SELS to a top of the waveguide network via a flip chip type coupling. In some embodiments, the method further comprises forming the waveguide network on top of the package substrate, positioning the photodetectors and SELS within the waveguide network adjacent to the package substrate and coupling the ASICs to a top of the waveguide network opposite the package substrate. In some embodiments, the method further comprises forming the waveguide network on top of the package substrate, positioning the ASICs within the waveguide network adjacent to the package substrate and coupling the photodetectors and the SELS to a top of the waveguide network opposite the package substrate. In some embodiments, the method further comprises positioning the ASICs on top of the package substrate, positioning the photodetectors and the SELS on top of the ASICs and positioning the waveguide network proximate the photodetectors and the SELS opposite the top of the ASICs such that there is a gap between the waveguide network and the photodetectors and the SELS.

BRIEF DESCRIPTION OF THE DRAWINGS

FIG. 4 illustrates a side cross-section block view of the optical-electrical integrated circuit system having an active optical interposer configuration according to some embodiments.

FIG. 5 illustrates a side cross-section block view of the optical-electrical integrated circuit system having a photonic redistribution layer configuration according to some embodiments.

FIG. 6 illustrates a side cross-section block view of the optical-electrical integrated circuit system having a raised waveguide network configuration according to some embodiments.

FIG. 7 illustrates a method of implementing the optical-electrical integrated circuit system according to some embodiments.

FIG. 8D illustrates a vertical optical signal coupling of a SELS and a waveguide network with a lens according to some embodiments.

FIG. 8E illustrates a vertical optical signal coupling of a SELS and a waveguide network with a lens and a filter according to some embodiments.

FIG. 9A illustrates a bottom view of a SELS having a circular output aperture according to some embodiments.

FIG. 9B illustrates a bottom view of a SELS having a non-circular output aperture according to some embodiments.

FIG. 10 illustrates a top view of a portion of an optical coupler coupled to an end of an optical path according to some embodiments.

FIG. 11 illustrates a method of vertically integrating one or more SELS with a waveguide network in an optical-electrical integrated circuit system according to some embodiments.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to an optical-electrical integrated circuit system, method and device including an optical architecture including a waveguide network, one or more surface emitting light sources and one or more photodetectors that altogether optically couple together two or more integrated circuits or microchips of an electrical architecture. As a result, the system, method and device provide the advantage of providing flexible connectivity topologies that are impossible using only electrical connectivity methods due to their need for close proximity of components.

Figures 1, 2, 3:
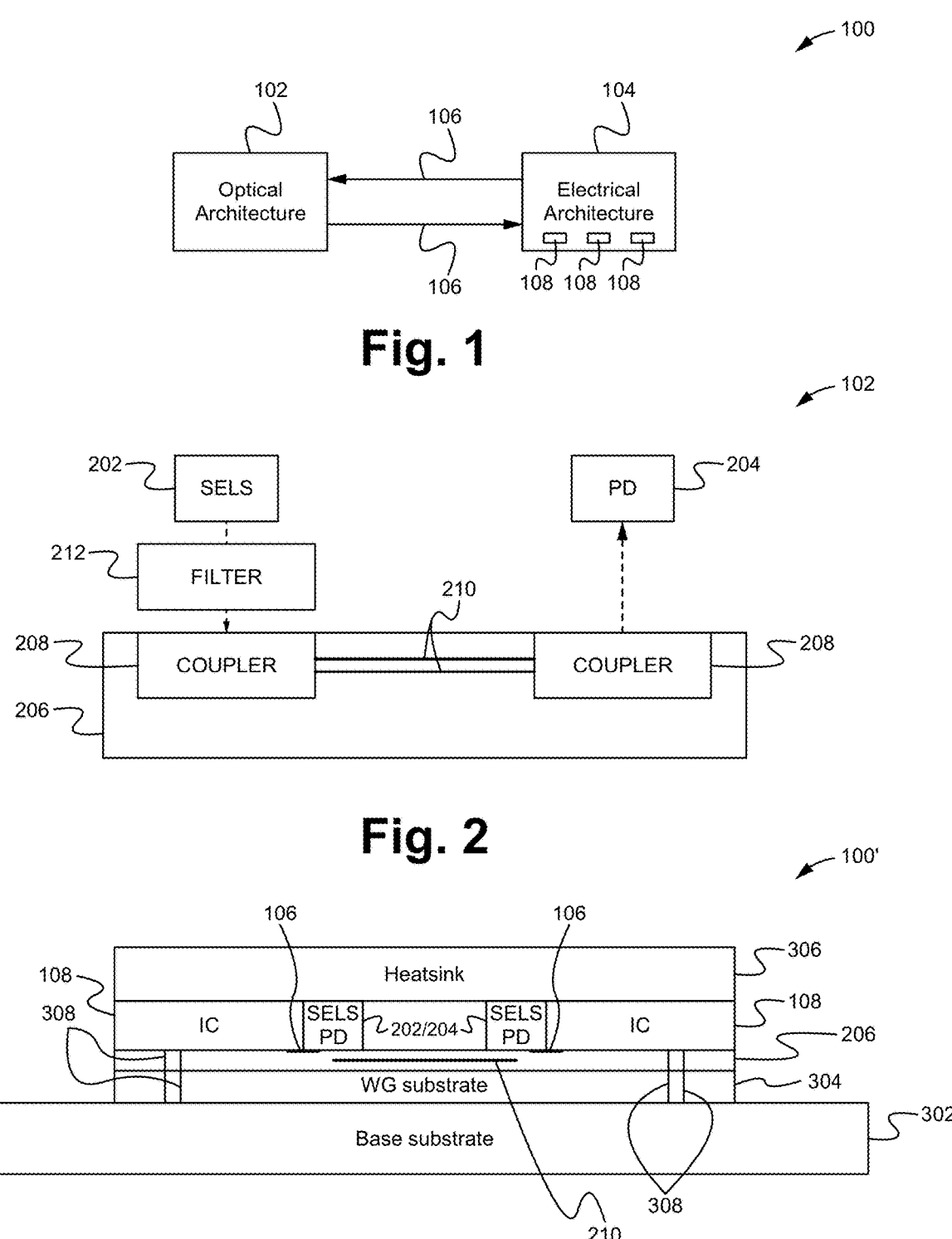
FIG. 1 illustrates an optical-electrical integrated circuit system according to some embodiments.
FIG. 2 illustrates the optical architecture according to some embodiments.
FIG. 3 illustrates a side cross-section block view of the optical-electrical integrated circuit system having a passive optical interposer configuration according to some embodiments.

FIG. 1 illustrates an optical-electrical integrated circuit system 100 according to some embodiments. As shown in FIG. 1, the system 100 comprises an optical architecture 102 electrically coupled with an electrical architecture 104 via an electrical network 106 including. The electrical network 106 is able to comprise one or more electrical connectors. For example, the electrical network 106 is able to comprise one or more electrical components and/or connections such as, but not limited to, one or more traces, vias (e.g. through silicon vias, through glass vias), ball grid arrays, solder balls, leadframes, fan outs, transimpedance amplifiers, drivers or other types of electrical connections and/or components known in the art. The electrical architecture 104 is able to comprise a plurality of integrated circuits (ICs) 108 that need to communicate with each other in order to perform the functions of the electrical architecture 104. Although shown in FIG. 1, the electrical architecture 104 comprises three ICs 108, more or less ICs 108 are contemplated. In some embodiments, the ICs 108 are able to be application specific integrated circuits (ASICs). In such embodiments, the ASICs are able to be full-custom, semi-custom, or programmable (e.g. field programmable gate arrays). Alternatively or in addition, one or more of the ICs 108 are able to be other types of ICs and/or microchips including integrated passive devices, memory/memory stacks, general purpose integrated circuits and/or microchips. In some embodiments, the ICs 108 are each individual singulated dies. Alternatively, one or more of the ICs 108 are able to be part of a same wafer, interposer or panel. In some embodiments, the electrical architecture 104 is able to further comprise one or more additional components such as, but not limited to, one or more heatsinks, package substrates, printed circuit boards, interposers, panels, wafers or other types of circuit components known in the art. Altogether, the electrical architecture 104 is able to form one or more electrical devices, computers, servers, smart phones, or portions thereof.

FIG. 2 illustrates the optical architecture 102 according to some embodiments. As shown in FIG. 2, the optical architecture 102 comprises one or more surface emitting light sources (SELS) 202 optically operationally coupled with one or more photodetectors (PDs) 204 via one or more waveguide networks 206 each having a plurality of optical couplers 208. Each optical coupler 208 is coupled to at least one other optical coupler 208 via one or more optical paths 210 through the waveguide network 206. The optical paths 210 are able to guide optical signals from one end of the path 210 to another end of the path 210. In particular, each end of a path 210 connects to a different one of the optical couplers 208 such that the optical coupler 208 enables optical signals to be transmitted into and/or out of that end of the path 210. Similarly, each of the SELS 202 and the photodetectors 204 are able to be optically operationally coupled with a different one of the optical couplers 208 for receiving optical signals from and/or transmitting optical signals through the paths 210 of the waveguide network 206 (via the optical couplers 208). For example, a path 210 is able to have a first end coupled with a first optical coupler 208 that is coupled with a SELS 202, and a second end coupled with a second optical coupler 208 that is coupled with a photodetector 204. Accordingly, the SELS 202 is able to transmit an optical signal into the path 210 via the first optical coupler 208 and the photodetector 204 is able to receive the transmitted optical signal from the other end of the path 210 via the second optical coupler 208. As described with respect to FIGS. 8A-8E below, the waveguide network 206 (and/or each layer thereof) is able to include cladding that surrounds the optical paths 210 to help facilitate the channeling of the optical signals through the paths 210.

In some embodiments, the optical architecture 102 further comprises one or more optical filters 212. In such embodiments, for one or more of the paths 210, the filters 212 are able to be positioned between the SELS 202 and the optical coupler 208 coupled to that SELS 202 and/or between the photodetector 204 and the optical coupler 208 coupled to that photodetector 204. As a result, the filters 212 are able to filter the light/optical signal transmitted into and/or received from the waveguide network 206. In particular, one or more of the filters 212 are able to be polarization filters that filters a multimoded optical signal received from one of the SELS 202 to a single mode and/or filters a multimoded optical signal output from the waveguide network 206 to a single mode before it is received by one of the photodetectors 204. Alternatively, other types of optical filters are able to be used. Alternatively, the optical filters 212 are able to be omitted. For example, in some embodiments the waveguide network 206 (and the paths 210 thereof) is able to be a multimodal waveguide that is able to simultaneously transmit multimodal optical signals such that use of the optical filters 212 is unnecessary and/or undesirable.

In some embodiments, the optical architecture 102 further comprises one or more lenses 802 (see FIGS. 8A-8E) in addition to or in lieu of the filters 212. In such embodiments, like with the optical filters 212, for one or more of the paths 210, the lenses 802 are able to be positioned between a SELS 202 and the optical coupler 208 coupled to that SELS 202. Alternatively or in addition, the lenses 802 are able to be positioned between a photodetector 204 and the optical coupler 208 coupled to that photodetector 204. As a result, the lenses 802 are able to focus and/or collimate the light/optical signal transmitted into and/or received from the waveguide network 206. In particular, one or more of the lenses 802 are able to be focusing or collimating lenses that focus or collimate the optical signal output from one of the SELS 202 and/or output from an optical coupler 208 of the waveguide network 206. Alternatively, other types of lenses are able to be used. Alternatively, the lenses 802 are able to be omitted. In some embodiments, the optical architecture 102 is able to comprise both lenses 802 and filters 212 in multiple different configurations (e.g. see FIGS. 8A-8E).

In some embodiments, the waveguide network 206 is able to comprise a plurality of horizontal layers wherein each layer has one or more optical paths 210 and the corresponding optical couplers 208 at the ends of the paths 210 that are all substantially aligned with a plane within that layer (and/or bounded by planes defining a top and bottom surface of the layer). In particular, as shown in FIGS. 8A-8E, in some embodiments the waveguide network 206 is able to include optical paths 210 embedded within a cladding 804 (formed on top of a substrate 302/304), wherein each set of paths 210/couplers 208 at the same vertical depth within the cladding 802 comprise a layer of the waveguide network 206. As a result, multiple optical paths 210 are able to (e.g. horizontally) overlap as they are positioned on top of each other in different layers. This overlapping is able to be configured such that the couplers 208 of each layer are not (e.g. vertically) optically blocked or obscured from receiving and/or transmitting optical signals (e.g. vertically) in/out of the waveguide network 206 with the corresponding SELS 202 and photodetectors 204. In other words, the paths 210 of one layer are able to horizontally cross and overlap the paths 210 of another layer, but the couplers 208 of each layer must be able to receive/transmit optical signals in/out of the waveguide network 206 vertically (e.g. they cannot be vertically blocked by the paths/couplers 208/210 of any of the other layers between that layer and the corresponding SELS/photodetector). The optical paths 210 are able to comprise material(s) that enable the transmission of the optical signals through the paths 210. In some embodiments, each of the layers (e.g. optical paths 210 and cladding 804) of the network 206 is able to have a thickness between 5-15 micrometers. Alternatively, the layers are able to have larger or smaller thicknesses. In some embodiments, the layers are able to conformally follow the warpage of the substrate upon which the layer is deposited (e.g. base or waveguide substrate, printed circuit board, interposer).

The SELS 202 are able to be single modal or multimodal and be one or more of light-emitting diodes (LEDs), micro light-emitting diodes (uLEDs), vertical cavity surface emitting lasers (VCSELs), and/or other types of low power light sources. The SELS 202 are able to vertically optically couple with the couplers 208 of the waveguide network 206. For example, the SELS 202 are able to be coupled to and/or positioned relative to the top surface of the waveguide network 206 (and/or a top of the optical couplers 208) such that the optical signal (and/or a direction thereof) output by the SELS 202 is perpendicular to the top surface of the waveguide network 206 (and/or the top surface of the optical couplers 208). Similarly, in some embodiments the optical signal (and/or a direction thereof) is able to be perpendicular to the optical paths 210 (and/or a direction of travel through the paths 210 by the optical signal). As a result, the SELS 202 and optical couplers 208 provide the advantage of enabling the optical signals to be input into the waveguide network 206 in a first direction (e.g. vertical) and then routed to another location in a second direction (e.g. horizontal) that is perpendicular to the first direction thereby enabling the paths 210 of the network 206 to be more efficiently organized with simple input/output locations. In such embodiments, the optical couplers 208 at the output of the optical paths 210 are similarly able to output the optical signal from the waveguide network 206 in a direction perpendicular to the second direction (and parallel to the first direction) where it is input by the photodetectors 204.

The photodetectors 204 are able to be normal incident photodetectors and/or other types of photodetectors. In some embodiments, as shown in FIG. 2, the photodetectors 204 are discreet from the waveguide network 206. Alternatively, one or more of the photodetectors 204 are able to be integrated into the waveguide network 206 (e.g. within the cladding) and/or substrate 302. As a result, in such embodiments the photodetectors 204 are optically coupled with the optical couplers 208 within the waveguide network 206 and/or substrate 302. As described above, the waveguide network 206 is able to have one or a plurality of layers each having one or a plurality of paths 210 configured to transmit single mode or multimodal optical signals. In some embodiments, the waveguide network 206 is silicon nitride (SiN) and/or is formed via a reticle stitching process. Alternatively, the waveguide network 206 is able to be polymer based and/or formed via an electronic based process. The optical paths 210 are able to be dielectric waveguide paths (e.g. that are formed using a deposition process), polymer waveguide paths (e.g. that are formed using a spin/spun process) and/or other types of waveguide path materials. The optical couplers 208 are able to be (single or multiple layer) grating couplers, 45-degree mirrors and/or other types of light couplers able to input optical signals into and transmit optical signals out of the paths 210 of the waveguide network 206. In some embodiments, wherein the optical coupler 208 is a grating coupler, the grating coupler is able to comprise a silicon nitride to waveguide path 210 transition or a silicon to silicon nitride to waveguide path 210 transition.

Although as shown in FIG. 2, the optical architecture 102 includes a single SELS 202, photodetector 204, waveguide network 206 and filter 212, the optical architecture 102 is able to comprise more or less SELS 202, photodetectors 204, waveguide networks 206 and/or filters 212. In some embodiments, the quantity of SELS 202 is equal to the quantity of photodetectors 204 and/or the quantity of paths 210. In some embodiments, the quantity of optical couplers 208 is equal to double the number of paths 210. In some embodiments, one or more of the paths 210 are unidirectional (e.g. signals transmitted from a first SELS 202 through a first end of the path 210 to a first photodetector 204 at a second end of the path 210). Alternatively, one or more of the paths are bidirectional (e.g. signals transmitted both from a first SELS 202 into a first end of the path 210 to a first photodetector 204 at a second end of the path 210, and from a second SELS 202 into the second end of the path 210 to a second photodetector 204 at the first end of the path 210).

In operation, at least one IC 108 of the electrical architecture 104 generates and/or transmits an electrical signal to one of the SELS 202 of the optical architecture 102 via the electrical network 106. In some embodiments, the electrical architecture 104 and/or the ICs 108 receive electrical power from the electrical network 106 (through one or more vias). The SELS 202 converts the electrical signal to an optical signal and transmits the optical signal into a path 210 of a layer of the waveguide network 206 via a corresponding optical coupler 208 that is optically coupled with the SELS 202 and the path 210. In some embodiments, an optical filter 212 filters the optical signal output by the SELS 202 before it is received by the corresponding optical coupler 208. The optical coupler 208 routes the received optical signal into the path 210 of the waveguide network 206 until it is received at the other end of the path 210 by another optical coupler 208, which reroutes the optical signal out of the waveguide network 206 and into a corresponding photodetector 204 that is optically coupled with that optical coupler 208. In some embodiments, an optical filter 212 filters the optical signal output by the optical coupler 208 before it is received by the corresponding photodetector 204. The corresponding photodetector 204 then converts the received optical signal back into an electrical signal (that matches and/or corresponds to the electrical signal received by the SELS 202) and transmits the electrical signal to another of the ICs 108 via the electrical network 106 (which is then able to process the data of the electrical signal in order to provide the functioning of the electrical architecture 104). As a result, the system 100 provides the advantage of enabling the two ICs 108 to communicate/operate with each other without being in close proximity to each other by using the optical architecture 102 to bridge the gap between the electrical architecture 104.

FIG. 3 illustrates a side cross-section block view of the optical-electrical integrated circuit system 100' having a passive optical interposer configuration according to some embodiments. As shown in FIG. 3, the system 100', as configured in the passive optical interposer configuration, further comprises a base substrate 302 (e.g. package substrate), a waveguide substrate 304, a heatsink 306 and one or more vias 308 (of the electrical network 106). The waveguide substrate 304 is formed on top of the base substrate 302 and the waveguide network 206 is formed on top of the waveguide substrate 304. A plurality of ICs 108, a plurality of SELS 202 and a plurality photodetectors 204 are positioned on top of the waveguide network 206 with the heatsink 306 positioned on top of the ICs 108. Each of the ICs 108 are electrically coupled with one or more of the SELS 202 and one or more of the photodetectors 204 via the electrical network 106 (e.g. metal traces). Additionally, each of the SELS 202 and photodetectors 204 are positioned such that they are each optically coupled with one of the optical couplers 208 (not shown) at either end of the one or more paths 210 within the waveguide network 206. The one or more vias 308 extend from the base substrate 302 through both the waveguide substrate 304 and the waveguide network 206 to each of the ICs 108 for providing electrical power and/or electrical signals from components of the base substrate 302 to the ICs 108.

The ICs 108 are able to be attached to the top of the waveguide network 206 as a die in a flip-chip configuration. Similarly, one or more of the SELS 202 and/or photodetectors 204 are able to be attached to the top of the waveguide network 206 in a flip-chip configuration. The waveguide substrate 304 is able to be glass or silicon such that the vias 308 are correspondingly through glass vias (TGV) or through silicon vias (TSV). Alternatively, the waveguide substrate 304 is able to comprise an interposer, organic laminate/package, glass, fan-out package, printed circuit board, silicon and/or other types of substrate materials known in the art. The waveguide network 206 is able to have one or more layers that are layered on top of the waveguide substrate 304 at predetermined locations. The base substrate 302 is able to comprise an interposer, organic laminate/package, glass, fan-out package, printed circuit board, silicon and/or other types of substrate materials known in the art. Alternatively, one or both of the waveguide substrate 304 and the base substrate 302 described herein are able to comprise silicon nitride waveguide on silicon; silicon waveguide on silicon; glass waveguide on glass; polymer waveguide on silicon; polymer waveguide on glass; or polymer waveguide on printed circuit board. Further, the base substrate 302 is able to have one or more electrical components that are electrically coupled with the vias 308 for providing power and/or electrical signal to the vias 308. In operation, the optical-electrical integrated circuit system 100' having a passive optical interposer configuration is able to operate in the same manner as described above with respect to FIG. 2 except with the base substrate 302 providing power and/or other signals to the ICs 108 using the vias 308 and the heatsink 306 absorbing and distributing heat away from the ICs 108 (and/or other components of the system).

FIG. 4 illustrates a side cross-section block view of the optical-electrical integrated circuit system 100" having an active optical interposer configuration according to some embodiments. As shown in FIG. 4, the system 100", as configured in the active optical interposer configuration, includes the base substrate 302, wherein the base substrate 302 is able to be a printed circuit board (PCB), an (active or passive) interposer, panel and/or other type of substrate. The photodetectors 204 and SELS 202 are bonded (or microtransfer printed) to a top surface of the substrate 302 and the waveguide network 206 is formed in one or more layers over the photodetectors 204, SELS 202 and at least a portion of the substrate 302. The ICs 108 are coupled to a top surface of the waveguide network 206. One or more vias 308 of the electrical network 106 are formed through waveguide network 206 from the ICs 108 (e.g. from contact pads, bumping pads, micro-bumps thereof) to the photodetectors 204 and SELS 202 such that the ICs 108 are able to transmit electrical signals to the SELS 202 and the photodetectors 204 are able to transmit electrical signals to the ICs 108. Further, the SELS 202 and photodetectors 204 are in optical communication with optical couplers 208 (not shown) at the ends of the optical paths 210 of the network 206. The heatsink 306 is positioned adjacent to and/or contacting the opposite side of the ICs 108 for dissipating heat generated by the ICs 108 (and/or other components of the system). In some embodiments, the ICs 108 are attached to the top of the waveguide network 206 in a flip chip configuration as dies and/or as a wafer. In some embodiments, the waveguide network 206 (and the layers thereof) is fabricated and/or planarized using a polymer based process. In some embodiments, one or more traces of the electrical network 106 are able to be formed on top of the waveguide network 106 in order to provide power from a power source to the ICs 108.

Like in the passive optical interposer in FIG. 3, the waveguide network 206 is able to have one or more layers that are layered on top of the base substrate 302 at predetermined locations. The base substrate 302 is able to comprise an interposer, organic laminate/package, glass, fan-out package, printed circuit board, silicon and/or other types of substrate materials known in the art. Further, the base substrate 302 is able to have one or more electrical components (e.g. vias, traces and/or other type of electrical components). In operation, the optical-electrical integrated circuit system 100" having an active optical interposer configuration is able to operate in the same manner as described above except with the heatsink 306 absorbing and distributing heat away from the ICs 108 (and/or other components of the system).

FIG. 5 illustrates a side cross-section block view of the optical-electrical integrated circuit system 100''' having a photonic redistribution layer configuration according to some embodiments. As shown in FIG. 5, the system 100''', as configured in the photonic redistribution layer configuration, includes the base substrate 302, wherein the base substrate 302 is able to be an interposer, panel and/or other type of substrate. The ICs 108 are attached and/or bonded to a top of the base substrate 302 and the waveguide network 206 is formed in one or more layers over the ICs 108 and at least a portion of the of the substrate 302. The photodetectors 204 and SELS 202 are coupled to a top surface of the waveguide network 206 (e.g. in the flip-chip configuration). One or more vias 308 of the electrical network 106 are formed through waveguide network 206 from the ICs 108 (e.g. from contact pads, bumping pads, micro-bumps thereof) to the photodetectors 204 and SELS 202 such that the ICs 108 are able to transmit electrical signals to the SELS 202 and the photodetectors 204 are able to transmit electrical signals to the ICs 108. In some embodiments, the ICs 108 are coupled as individual dies. Alternatively, the ICs 108 are coupled as a wafer for wafer level communication.

Further, the SELS 202 and photodetectors 204 are in optical communication with optical couplers 208 (not shown) at the ends of the optical paths 210 of the network 206. In some embodiments, in particular when the ICs 108 are attached at a die level, the waveguide network 206 (and the layers thereof) is able to be fabricated and/or planarized on top of the ICs 108 using a polymer based process.

Alternatively, in particular when the ICs 108 are attached at a wafer level, reticle stitching is able to be used to form a silicon nitride or polymer based waveguide network 206. Alternatively, reticle stitching is able to be optional for both active and passive optical architecture/interposers. In some embodiments, one or more traces of the electrical network 106 are able to be formed on top of the waveguide network 106 in order to provide power from a power source to the ICs 108.

Like in the passive optical interposer in FIG. 3, the waveguide network 206 is able to have one or more layers that are layered on top of the base substrate 302 at predetermined locations. The base substrate 302 is able to comprise an interposer, organic laminate/package, glass, fan-out package, printed circuit board, silicon and/or other types of substrate materials known in the art. Further, the base substrate 302 is able to have one or more electrical components (e.g. vias, traces and/or other type of electrical components). In operation, the optical-electrical integrated circuit system 100" having a photonic redistribution layer configuration is able to operate in the same manner as described above with respect to the active optical interposer configuration except without the heatsink 306.

FIG. 6 illustrates a side cross-section block view of the optical-electrical integrated circuit system 100"" having a raised waveguide network configuration according to some embodiments. As shown in FIG. 6, the system 100"" as configured in the raised waveguide network configuration includes the base substrate 302, wherein the base substrate 302 is able to be an interposer, panel and/or other type of substrate. The ICs 108 are attached and/or bonded to a top of the base substrate 302 and photodetectors 204 and SELS 202 are coupled to a top surface of ICs 108. The waveguide network 206 is formed in one or more layers on top of one or more pillars 502 positioned on top of the ICs 108 such that the SELS 202 and photodetectors 204 are in between the waveguide network 206 and the top of the ICs 108. The electrical network 106 (not shown) is able to extend at least partially on top of the ICs 108 and/or below the SELS/ photodetectors 202, 204 and include one or more micro-balls, ball grid arrays, traces, contact pads and/or other types of electrical connections that electrically couple the SELS/ photodetectors 202, 204 with the ICs 108 such that the ICs 108 are able to transmit electrical signals to the SELS 202 and the photodetectors 204 are able to transmit electrical signals to the ICs 108. In some embodiments, the ICs 108 are coupled as individual dies. Alternatively, the ICs 108 are coupled as a wafer for wafer level communication.

Further, the SELS 202 and photodetectors 204 are in optical communication with optical couplers 208 (not shown) at the ends of the optical paths 210 of the waveguide network 206. In some embodiments, the gap between the bottom of the waveguide network 206 and the SELS 202 and photodetectors 204 is able to be minimized and/or removed based on the height of the pillars 502. In some embodiments, the electrical network 106 (not shown) is able to extend at least partially adjacent to the ICs and/or between the ICs 108 and the base substrate 302 in order to provide power from a power source (e.g. coupled to the substrate 302) to the ICs 108. In some embodiments, the pillars 502 are able to be metallic, polymer or other types of pillars that provide structural support to maintain the orientation and position of the waveguide network 206 with the respect to the electrical architecture 104.

Like in the passive optical interposer in FIG. 3, the waveguide network 206 is able to have one or more layers at predetermined locations and the base substrate 302 is able to comprise an interposer, organic laminate/package, glass, fan-out package, printed circuit board, silicon and/or other types of substrate materials known in the art. Further, the base substrate 302 is able to have one or more electrical components (e.g. vias, traces and/or other type of electrical components). In operation, the optical-electrical integrated circuit system 10"" having a raised waveguide network configuration is able to operate in the same manner as described above with respect to the photonic redistribution layer configuration. Although not shown in FIGS. 3-6 for the sake of clarity, it is contemplated that one or more filters 212 are able to be positioned between one or more of the SELS 202 and waveguide network 206 (e.g. between the one or more SELS 202 and the optical coupler 208 that is optically coupled with that SELS 202). Similarly, although not shown in FIGS. 3-6 for the sake of clarity, it is contemplated that one or more filters 212 are able to be positioned between one or more of the photodetectors 204 and waveguide network 206 (e.g. between the one or more photodetectors 204 and the optical coupler 208 that is optically coupled with that photodetector 204). In such embodiments, in operation the filters 212 would perform desired filtering (e.g. polarization filtering) of the optical signals transmitted through the filters 212.

FIG. 7 illustrates a method of implementing the optical-electrical integrated circuit system 100 according to some embodiments. As shown in FIG. 7, a package substrate or interposer 302 is provided at the step 702. The package substrate and/or interposer 302 are able to be a wafer, panel, printed circuit board or other passive or active structure for providing support and/or electrical connectivity to the system 100. Each of a plurality of integrated circuits 108 (e.g. ASICs) is electrically coupled to at least one of a plurality of surface emitting light sources (SELS) 202 for transmitting electrical signals to the at least one of the SELS 202 at the step 704. Each of the plurality of integrated circuits 108 is electrically coupled to at least one of a plurality of photo-detectors 204 for receiving the electrical signals from the at least one of the photodetectors 204 at the step 706. A waveguide network 206 is provided at the step 708. As described above, the waveguide network 206 is able to comprise a plurality of waveguide paths 210 that extend through one of one or more levels of the network 206 and that each optically guide light between a first end of the path 210 a second end of the path 210. Each of the first ends is optically coupled with a different one of the SELS 202 for receiving an optical signal from the different one of the SELS 202 at the step 710. Similarly, each of the second ends is optically coupled with a different one of the photodetec-tors 204 for transmitting the optical signal to the different one of the photodetectors 204 at the step 712. As a result, the method provides the advantage of enabling the ICs 108 to be spaced further apart than is possible with standard electrical connections without sacrificing processing efficiency.

In some embodiments, the method further comprises transmitting messages between the integrated circuits 108 by converting the electrical signals received from the ICs 108 (e.g. via metal traces of the electrical network 106) to the optical signals transmitted to the first ends with the SELS 202 and converting the optical signals received from the second ends to the electrical signals transmitted to the ICs 108 (e.g. via metal traces of the electrical network 106) with the photodetectors 204. In some embodiments wherein the optical signal is multimodal, the method is able to further comprise filtering the optical signals output by the SELS 202 before the optical signals are received by the first ends by positioning one or more polarization filters 212 between each of the first ends and the different one of the SELS 202 optically coupled with the first end. Alternatively, the pro-vided waveguide network 206 is able to be configured to be multimodal in order to receive and transport a multimodal optical signal.

In some embodiments, the method is able to further comprise forming an additional substrate 304 (e.g. glass, silicon) on the package substrate 302, forming the wave-guide network 206 on top of the additional substrate 304 and coupling the ICs 108, photodetectors 204 and SELS 202 to a top of the waveguide network 206 via a flip chip type coupling. In such embodiments, the ICs 108 are each able to be attached to the top of the waveguide network 206 as a die. Further, each of the one or more layers of the waveguide network 206 (which each include one or more optical paths 210) are able to be fabricated in predetermined positions associated with the desired positions of the SELS 202, photodetectors 204 and/or ICs 108. In some embodiments, the method is able to further comprises providing electrical power to the ICs 108 from the package substrate 302 (and/or other components coupled therewith) using one or more vias 308 (e.g. through silicon or through glass vias) that extend from the package substrate 302 through the additional substrate 304 and the waveguide network 206 to the ICs 108. In such embodiments, metal traces of the electrical network 106 are able to be formed on top of portions of the waveguide network 206 between the ICs 108 and the SELS/photodetectors 202, 204 to transmit the electrical signals/messages therebetween. As a result, the method is able to generate a passive optical interposer coupled with a plurality of ICs 108 in a flip-chip connection type package for enabling light-based communication between the ICs 108.

In some embodiments, the method is able to further comprise forming the waveguide network 206 on top of the package substrate 302, positioning the photodetectors 204 and SELS 202 within the waveguide network 206 adjacent to the package substrate 302 and coupling the ICs 108 to a top of the waveguide network 206 opposite the package substrate 302. In such embodiments, the SELS 202 and/or photodetectors 204 are able to be bonded on the top of the package substrate/panel/interposer 302 with the waveguide network 206 formed thereupon. In such embodiments, the ICs 108 are able to be attached as individual dies or as a wafer (of one or more dies). In some embodiments, a polymer based process is able to be used to fabricate vias through the waveguide network 206 thereby electrically coupling the SELS 202, photodetectors 204 and/or package substrate 302 with the ICs 108 (e.g. with bump pads thereof). In some embodiments, a polymer based process is able to be used to planarize and fabricate the layers of the waveguide network 206 on the package substrate (with the SELS/photodetectors 202, 204 within one or more layers of the network 206). As a result, the method is able to generate an active optical interposer coupled with the plurality of ICs 108 in a flip-chip connection type package for enabling light-based communication between the ICs 108.

In some embodiments, the method is able to comprise forming the waveguide network 206 on a bottom surface of the package substrate 302, positioning the ICs 108 on interposers on the top surface of the package substrate 302, coupling the photodetectors 204 and the SELS 202 to a bottom of the waveguide network 206 opposite the bottom surface of the package substrate 302, and forming vias through the waveguide network 206 that electrically couple the SELS 202 and/or photodetectors 204 with the ICs 108 via the electrical network 106 formed on and through the substrate 302 (e.g. from the bottom surface to the top surface) and the interposers electrically coupling the electrical network 106 with the ICs 108. In some embodiments, the method is able to comprise forming the waveguide network 206 on top of the package substrate 302, positioning the ICs 108 within the waveguide network 206 adjacent to the package substrate 302 and coupling the photodetectors 204 and the SELS 202 to a top of the waveguide network 206 opposite the package substrate 302. In some embodiments, the method is able to comprises positioning the ASICs on top of the package substrate 302, positioning the photodetectors 204 and the SELS 202 on top of the ICs 108 and positioning the waveguide network 206 proximate the photodetectors 204 and the SELS 202 opposite the top of the ICs 108 such that there is a gap between the waveguide network 206 and the photodetectors 204 and the SELS 202. In any of these embodiments, this configuration is used for wafer level optical connectivity/communication. Alternatively, the configuration is able to be used for die level optical connectivity/communication. If an IC 108 is attached through die level, similar to the active optical interposer described above, a polymer based process is able to be used to planarize and fabricate the layers of the waveguide network 206. Alternatively, if a wafer level IC 108 is used, either a polymer based waveguide network 206 or a silicon (e.g. silicon nitride) based waveguide network 206 with reticle stitching is able to be used. As described above, with both active and passive waveguide networks and/or substrates 302, use of the reticle stitching is optional. In either case, the method is able to generate a photonic redistribution layer (photonic RDL) coupled with the plurality of ICs 108 in a flip-chip connection type package for enabling light-based communication between the ICs 108.

Figure 8A:
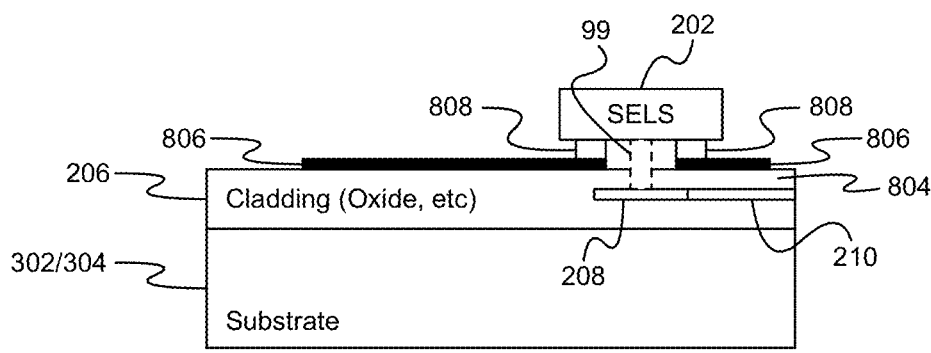
FIG. 8A illustrates a vertical optical signal coupling of a SELS and a waveguide network without a lens or a filter according to some embodiments.

FIGS. 8A-8E illustrate detailed views of exemplary vertical optical signal couplings of the SELS 202 and the waveguide network 206 according to some embodiments. FIG. 8A illustrates a vertical optical signal coupling of a SELS 202 and a waveguide network 206 without a lens 802 or a filter 212 according to some embodiments. As shown in FIG. 8A, the SELS 202 is able to receive an electrical signal from one or more ICs 108 (not shown) via one or more metal traces 806 on the top of the waveguide network 206 and metal bumps 808 on the bottom of the SELS 202. Specifically, the metal traces 806 and/or bumps 808 are able to be a part of the electrical network 106 that electrically couples the ICs 108 and the SELS 202. Each SELS 202 is able to be coupled with one or a plurality of ICs 108 via one or a plurality of traces/metal balls 806/808. Further, as shown in FIG. 8A, the optical path 210 and optical coupler 208 at one end of the path 210 are both embedded within a cladding 804 of the waveguide network 206, which is deposited on top of a substrate 302/304. The SELS 202 is positioned directly (e.g. vertically) above the optical coupler 208 such that an output aperture on the bottom surface of the SELS 202 faces and is vertically aligned with a top surface of the coupler 208 (and/or cladding/waveguide network 804/206). As a result, when the SELS 202 outputs the optical signal 99 from the output aperture, the signal 99 enters the optical coupler 208 from a first direction (e.g. vertically) which reroutes the signal 99 in a second direction (e.g. horizontally) through the optical path 210 (to an output end of the path 210 having another coupler 208 coupled with a photodetector 204). Thus, the configuration provides the benefit of enabling optical signals 99 to be input into the waveguide network 206 from a first direction (e.g. vertically) and then be transmitted to another location in a perpendicular direction (e.g. horizontally).

The SELS 202 is able to output a single or multi-mode optical signal 99. The optical coupler 208 is able to be a 45-degree mirror, a multimode (single or multiple layer) grating coupler, a single mode (single or multiple layer) grating coupler and/or other types of optical couplers. The cladding 804 is able to comprise oxide and/or other types of cladding material. The substrate 302/304 is able to comprise glass, silicon-on-insulator, and/or other types of materials. The optical paths 210 are able to comprise single- or multi-mode nitride, polymer and/or other types of optical paths. The SELS 202 is able to be coupled to the top of the waveguide network 206 in a conventional chip or flip chip bonding technique, wherein the bottom surface (having the output aperture) of the SELS 202 refers to the surface facing the optical coupler 208 within the network 206.

Figure 8B:
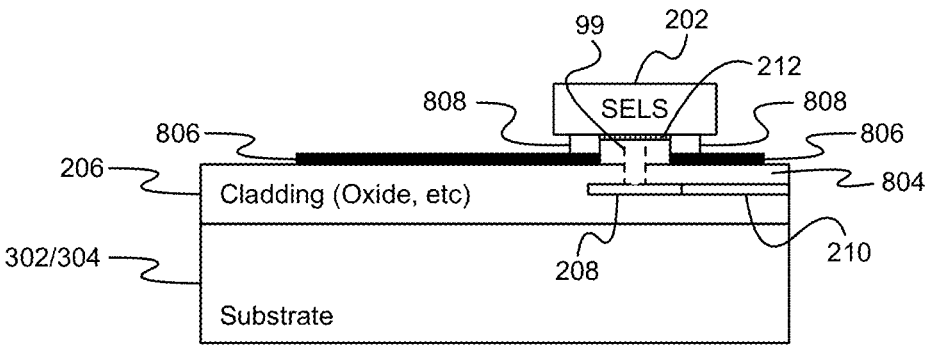
FIG. 8B illustrates a vertical optical signal coupling of a SELS and a waveguide network with a filter coupled to the SELS according to some embodiments.
Figure 8C:
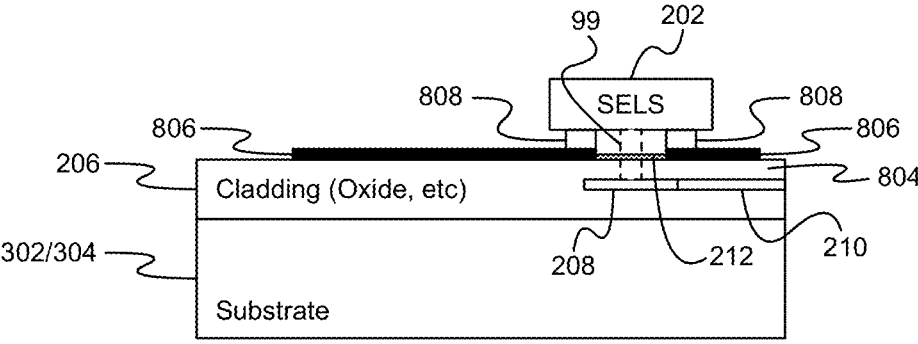
FIG. 8C illustrates a vertical optical signal coupling of a SELS and a waveguide network with a filter coupled to the waveguide network according to some embodiments.

FIGS. 8B and 8C illustrate vertical optical signal couplings of a SELS 202 and a waveguide network 206 with a filter 212 coupled to the SELS 202, and with a filter 212 coupled to the waveguide network 206, respectively, according to some embodiments. The vertical optical signal couplings shown in FIGS. 8B and 8C are able to be substantially the same as the vertical optical signal coupling shown in FIG. 8A, except for the differences described herein. Specifically, as shown in FIG. 8B the coupling further comprises a filter 212 coupled to the bottom surface of the SELS 202. The filter 212 is able to be aligned with and/or cover the output aperture of the SELS 202 such that the filter 212 receives the optical signal 99 output by the SELS 202. As a result, the filter 212 is able to filter the optical signal 99 as desired before it is received by the optical coupler 208.

In contrast, in FIG. 8C the filter 212 is coupled to a top surface of the waveguide network 206 (and/or cladding 804). In such embodiments, the filter 212 is able to be aligned with and/or cover the top of the optical coupler 208 within the waveguide network 206 such that the filter 212 is between the output aperture of the SELS 202 and the input/top surface of the optical coupler 208 such that the filter 212 receives the optical signal 99 output by the SELS 202. As a result, like in FIG. 8B, the filter 212 in FIG. 8C is able to filter the optical signal 99 as desired before it is received by the optical coupler 208. Consequently, the couplings of FIGS. 8B and C provide the benefit of enabling the optical signal 99 to be desirably filtered before it is transmitted through the waveguide network 206. In some embodiments, the filter 212 is a multi-mode filter that only permits one or more desires modes of the optical signal 99 to pass through to the optical coupler 208. Alternatively, the filter 212 is able to be a single mode filter. Alternatively, the filter 212 is able to filter mode, polarity and/or other characteristics of the optical signal 99.

FIG. 8D illustrates a vertical optical signal coupling of a SELS 202 and a waveguide network 206 with a lens 802 coupled to the SELS 202 according to some embodiments. The vertical optical signal coupling shown in FIG. 8D is able to be substantially the same as the vertical optical signal coupling shown in FIG. 8A, except for the differences described herein. Specifically, as shown in FIG. 8D the coupling further comprises a lens 802 coupled to the bottom surface of the SELS 202. The lens 802 is able to be aligned with and/or cover the output aperture of the SELS 202 such that the lens 802 receives the optical signal 99 output by the SELS 202. As a result, the lens 802 is able to adjust the optical signal 99 as desired before it is received by the optical coupler 208. For example, in some embodiments the lens 802 is able to be a collimating lens that collimates the optical signal 99 as it is output by the SELS 202. Alternatively or in addition, the lens 802 is able to focus the optical signal 99 onto the surface of the optical coupler 208. In some embodiments, the size of the output aperture and/or the optical signal as output by the SELS 202 is able to be different than the size of the optical signal after it is adjusted (e.g. focused) by the lens 802 and/or as it is received by the optical coupler 208. Accordingly, the coupling of FIG. 8D provides the benefit of lowering the coupling loss caused by the transmission of the optical signal 99 between the SELS 202 and the optical coupler 208 (e.g. by collimating and/or focusing the signal 99 on the optical coupler 208).

FIG. 8E illustrates a vertical optical signal coupling of a SELS 202 and a waveguide network 206 with both a lens 802 and a filter 212 according to some embodiments. The vertical optical signal coupling shown in FIG. 8E is able to be substantially the same as the vertical optical signal coupling shown in FIG. 8A, except for the differences described herein. Specifically, as shown in FIG. 8E, the lens 802 is coupled to the bottom surface of the SELS 202 and the filter 212 is coupled to a top surface of the waveguide network 206 (and/or cladding 804). Like in FIG. 8D, the lens 802 is able to be aligned with and/or cover the output aperture of the SELS 202 and like in FIG. 8C, the filter 212 is able to be aligned with and/or cover the top of the optical coupler 208. As a result, the lens 802 is able to receive and adjust the optical signal 99 as desired before it is received by the filter 212, which is subsequently able to filter the optical signal 99 as adjusted by the lens 802 before the adjusted/filtered signal is input by the optical coupler 208. The type of adjustment by the lens 802 and/or the filtering by the filter 212 is able to be substantially the same as the adjustment described in FIG. 8D and the filtering described in FIG. 8C. Consequently, the coupling of FIG. 8E provides the benefit of enabling the optical signal 99 to be desirably filtered and optically adjusted before it is transmitted through the waveguide network 206. Indeed, this provides the benefit of lowering the coupling loss caused by the transmission of the optical signal 99 between the SELS 202 and the optical coupler 208.

FIGS. 9A and 9B illustrate bottom views of a SELS 202 having a circular output aperture 904 and a non-circular output aperture 904, respectively, according to some embodiments. As shown in FIGS. 9A and 9B, the SELS 202 comprise a bottom surface 902 having one or more metal contacts/pads 906 and an output aperture 904. The metal contacts 902 are able to be positioned about a perimeter of the bottom surface 902 (e.g. in one or more corners of the perimeter). As a result, the electrical network 106 is able to be electrically coupled to the SELS 202 by coupling to the metal contacts 906 in order to transmit the electrical signals to the SELS 202. Although as shown in FIGS. 9A and 9B, the SELS 202 comprises two metal contacts 906 positioned in diagonal corners of the perimeter of the bottom surface 902, more or less metal contacts 906 are able to be used positioned in any combination of the corners and/or along one of the edges/sides of the perimeter of the bottom surface 902.

As shown in FIG. 9A, the output aperture 904 is able to be circular (and thus the output optical signal 99 is able to be circular). Alternatively, the output aperture 904 (and/or the optical signal 99) is able to have non-circular shapes. In particular, as shown in FIG. 9B, the output aperture 904 is able to have a shape that matches or is congruent with the shape of a perimeter of the optical couplers 208. As a result, the shape of the output optical signal 99 matches the shape of the perimeter of the optical couplers 208 to facilitate input of the optical signal 99 by the couplers 908. For example, the shape output aperture 904 and the shape of the perimeter of the corresponding optical coupler 208 are both able to be congruent trapezoids or other shapes.

In some embodiments, the dimensions of the output aperture 902 (and/or the optical signal 99 as output) are able to also equal the dimensions of the perimeter of the corresponding optical coupler 208 (e.g. when the optical signal 99 is collimated or focused by a lens 802 such that its dimensions do not significantly vary as the signal 99 travels from the output aperture 904 to the surface of the optical coupler 208). Alternatively, the dimensions of the output aperture 902 (and/or the optical signal 99 as output) are able to be proportional, but not equal to the dimensions of the perimeter of the corresponding optical coupler 208 (e.g. when the optical signal 99 is focused by a lens 802 such that its dimensions are reduced as the signal 99 travels from the output aperture 904 to the surface of the optical coupler 208). In particular, in such embodiments the dimensions of the output aperture 902 (and/or the optical signal 99 as output) are able to be proportionally larger or smaller than the dimensions of the optical coupler 208 such that the dimension of the optical signal 99 as received by the optical coupler 208 (e.g. as reduced or enlarged by the lens 802) match the dimensions of the perimeter of the optical coupler 208. As a result, the system 100 provides the advantage of enabling more efficient optical transmission between the SELS 202 and the optical couplers 208 by facilitating optical signals 99 that match the shape and/or dimensions of the receiving surface of the optical couplers 208.

FIG. 10 illustrates a top view of a portion of an optical coupler 208 coupled to an end of an optical path 210 according to some embodiments. As shown in FIG. 10, the optical coupler 208 has a sensing portion 1002 having a perimeter 1004 adjacent to a tapering portion 1006 coupled with the end of the optical path 210. As described above, the perimeter 1004 is able to have a shape that matches and/or is congruent with a shape of the output aperture 904 (and/or optical signal 99) of the SELS 202. The tapering portion 1006 is able to transition from the expanded width of the sensing portion 1002 to the narrower optical path 210. Indeed, because of the tapering, the optical coupler 208/optical path 210 provide the advantage of increasing the density of the optical signal 99 as it is transmitted through the optical path 210. In some embodiments, the tapering portion 1006 is an adiabatic taper. Alternatively, other types of tapering is able to be used.

FIG. 11 illustrates a method of vertically integrating one or more SELS 202 with a waveguide network 206 in an optical-electrical integrated circuit system 100 according to some embodiments. As shown in FIG. 11, one or more ICs 108 are electrically coupled with one or more SELS 202 at the step 1102. A waveguide network 206 is provided at the step 1104. As described above, the waveguide network 106 is able to comprise one or more layers, each of the layers including a substrate 302/304, cladding 804, at least one waveguide path 210 positioned within the cladding 804, an optical coupler 208 optically coupled to a first end of the path 210 and a second optical coupler 208 optically coupled to the second end of the path 210. The SELS 202 is optically coupled with the first optical coupler 208 and/or first end of the path 210 at the step 1106. The SELS 202 receives an electrical signal from one of the ICs 108 at the step 1108. For example, the electrical signal is able to be transmitted by the ICs 108 to one or more of the metal contacts 906 of the SELS 202. The SELS 202 converts the received electrical signal to an optical signal (that is based on the electrical signal) and outputs the optical signal from a bottom aperture 904 on a bottom surface 902 of the SELS 202 at the step

1110. The first optical coupler 208 receives the optical signal from a first direction (e.g. vertically) and routes the optical signal into the first end of the waveguide path 210 in a second direction (e.g. horizontally) at the step 1112. As a result, the method provides the advantage of enabling the optical signals to be vertically integrated into the waveguide network 206 which then is able to transport the signals in a perpendicular direction (e.g. horizontally) to their desired destination thereby reducing the space, heat and power constraints on the system 100.

In some embodiments, the method further comprises receiving, collimating (or focusing) and/or otherwise adjusting the optical signal 99 with the lens 802 before the optical signal 99 is received by the optical coupler 208. In some embodiments, the lens 802 alters a size/dimensions of a perimeter of the optical signal 99 to an altered size, and a perimeter of the bottom aperture 904 is dimensioned such that the altered size matches a size of a perimeter 1004 of a portion 1002 of the optical coupler 208 that receives the optical signal 99. In some embodiments, the method further comprises adjusting the polarization and/or mode of the optical signal 99 with the filter 212 before the optical signal 99 is received by the optical coupler 208.

Figure 12:
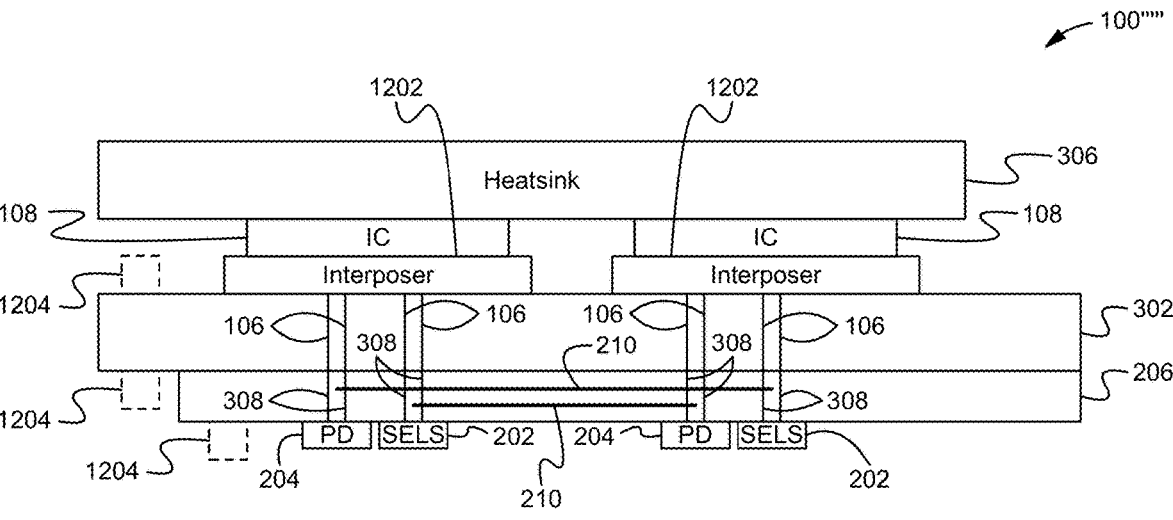
FIG. 12 illustrates a side cross-section block view of the optical-electrical integrated circuit system having a backside optical interposer configuration according to some embodiments.

FIG. 12 illustrates a side cross-section block view of the optical-electrical integrated circuit system 100'''' having a backside optical interposer configuration according to some embodiments. The system 100'''' of FIG. 12 is able to be substantially similar to the system 100'' of FIG. 4, except for the differences described herein. As shown in FIG. 12, the system 100'''', as configured in the backside optical interposer configuration, comprises the base substrate 302 (active or passive), one or more interposers 1202, one or more ICs 108, the waveguide network 206, a plurality of SELS 202, a plurality of photodetectors 204, one or more vias 308, the electrical network 106 (e.g. at least partially incorporated into and on the substrate 302), the heatsink 306 and one or more passive and/or active electrical components 1204. Although as shown in FIG. 12, the system 100'''' comprises two ICs 108, two interposers 1202, two pairs of SELS 202 and photodetectors 204 and three electrical components 1204 (positioned on different sides of the substrate 302 and on the waveguide network 206), more or less ICs 108, interposers 1202, pairs of SELS 202 and photodetectors 204 and/or electrical components 1204 (on each side of the substrate 302 and/or waveguide network 206) are contemplated. In some embodiments, the electrical components 1204 (on one or more of the sides of the substrate 302 and/or the bottom of the waveguide network 206) are able to be omitted.

The substrate 302 and waveguide network 206 are able to be substantially similar to the substrate 302 and waveguide network 206 in FIG. 4, except that the waveguide network 206 is deposited, spun or otherwise coupled to the bottom surface of the substrate 302. Additionally, instead of covering the entire bottom surface of the substrate 302, one or more sections of the waveguide network 206 are able to be removed such that portions of the bottom surface of the substrate 302 are exposed (enabling components 1204 to be coupled thereto). Alternatively, the entirety of the bottom surface of the substrate 302 is able to be covered by the waveguide network 206. The bottom face of the waveguide network 206 is able to comprise one or more fiducials that indicate a desired position of the SELS 202 and photodetectors 204 such that they are aligned and optically couple with the optical couplers 208 of the network 206 and/or aligned with and electrically couple with the vias 308 of the network 206.

The interposers 1202 are able to be electrically coupled to the top surface of the substrate 302 (via portions of the electrical network 106 on the top surface). The ICs 108 are each able to be electrically coupled to the top of one of the interposers 1202 such that the interposers 1202 (e.g. via one or more internal electrical paths/vias) form a bridge electrically coupling substrate 302 (e.g, the electrical network 106 thereof) to each of the ICs 108. In some embodiments, the ICs 108 are coupled to the interposers 1202 in a flip-chip configuration. Alternatively, the ICs 108 are able to be coupled to the interposers 1202 in non-flip-chip configurations. The heatsink 306 is coupled to the top of the ICs 108 for dissipating heat generated by the ICs 108 (and/or other components, such as the interposers 1202).

The SELS 202 and photodetectors 204 are able to be electrically coupled to the bottom face of waveguide network 206 (on the side of the waveguide network that is not coupled to the substrate 302). SELS 202 and photodetectors 204 are able to be electrically coupled to the bottom face via the vias 308 and/or other electrically conductive components (e.g. pads, balls, traces) at least partially positioned on the bottom face of the waveguide network 206. The vias 308 are able to extend from the bottom face of the waveguide network 206 to the bottom surface of the substrate 302. At bottom face of the waveguide network 206, the vias 308 are able to be electrically coupled with the SELS 202 and photodetectors 204. At the bottom surface of the substrate 302, the vias 308 are able to electrically couple with the electrical network 106 (e.g. contact pads, bumps, traces and/or vias thereof). Thus, altogether, the SELS 202 and photodetectors 204 are able to be electrically coupled with the ICs 108 (from the waveguide network vias 308 to the portions of the electrical network 106 extending through the substrate 302 to the electrical paths through the interposers 1202 to the balls and/or other electrical coupling elements of the ICs 108).

The electrical components 1204 are able to comprise one or more of a SELS driver, a transimpedance amplifier, an RLC circuit and/or other electrical components known in the art. The electrical components 1204 are able to electrically couple with the ICs 108, the SELS 202, and/or the photodetectors 204 for transmitting and/or receiving electrical signals therewith. In particular, the electrical components 1204 are able to electrically couple with one or more of the ICs 108, SELS 202 and/or photodetectors 204 via traces, vias, contact pads and/or other portions of the electrical network 106 on the bottom and/or top surfaces of the substrate 302 and/or on the bottom face of the waveguide network 206.

In some embodiments, one or more of the electrical components 1204 are able to drive, amplify and/or otherwise adjust the electrical signals received and/or transmitted by the SELS 202 and/or photodetectors 204. For example, the electrical components 1204 are able to include a PHY IP and transimpedance amplifier that controls and/or drives the SELS 202 via the electrical signals received from the ICs 108. The electrical components 1204 are able to be positioned on either surface of the substrate 302 including exposed bottom areas that are not covered by the waveguide network 206 and/or the bottom face of the waveguide network 206.

Like in the passive optical interposer in FIG. 3, the waveguide network 206 is able to have one or more layers. The base substrate 302 is able to comprise an interposer, organic laminate/package, glass, fan-out package, printed circuit board, silicon and/or other types of substrate materials known in the art. Further, as described above, the base substrate 302 is able to have one or more electrical components (e.g. vias, traces and/or other type of electrical components) forming a portion of the electrical network 206. In operation, the optical-electrical integrated circuit system 100"" having a backside optical interposer configuration is able to operate in the same manner as described above with respect to FIG. 2 except with the base substrate 302 providing power and/or other signals to the ICs 108 and/or electrical components 1204 using the electrical network 106 and/or interposers 1202, the heatsink 306 absorbing and distributing heat away from the ICs 108 (and/or other components, e.g. interposers 1202), and the electrical components 1204 providing power and/or electrical signals to the SELS 202 and/or photodetectors 204 using the vias 308 and/or other electrical paths on the bottom face of the network 206.

Figure 13:
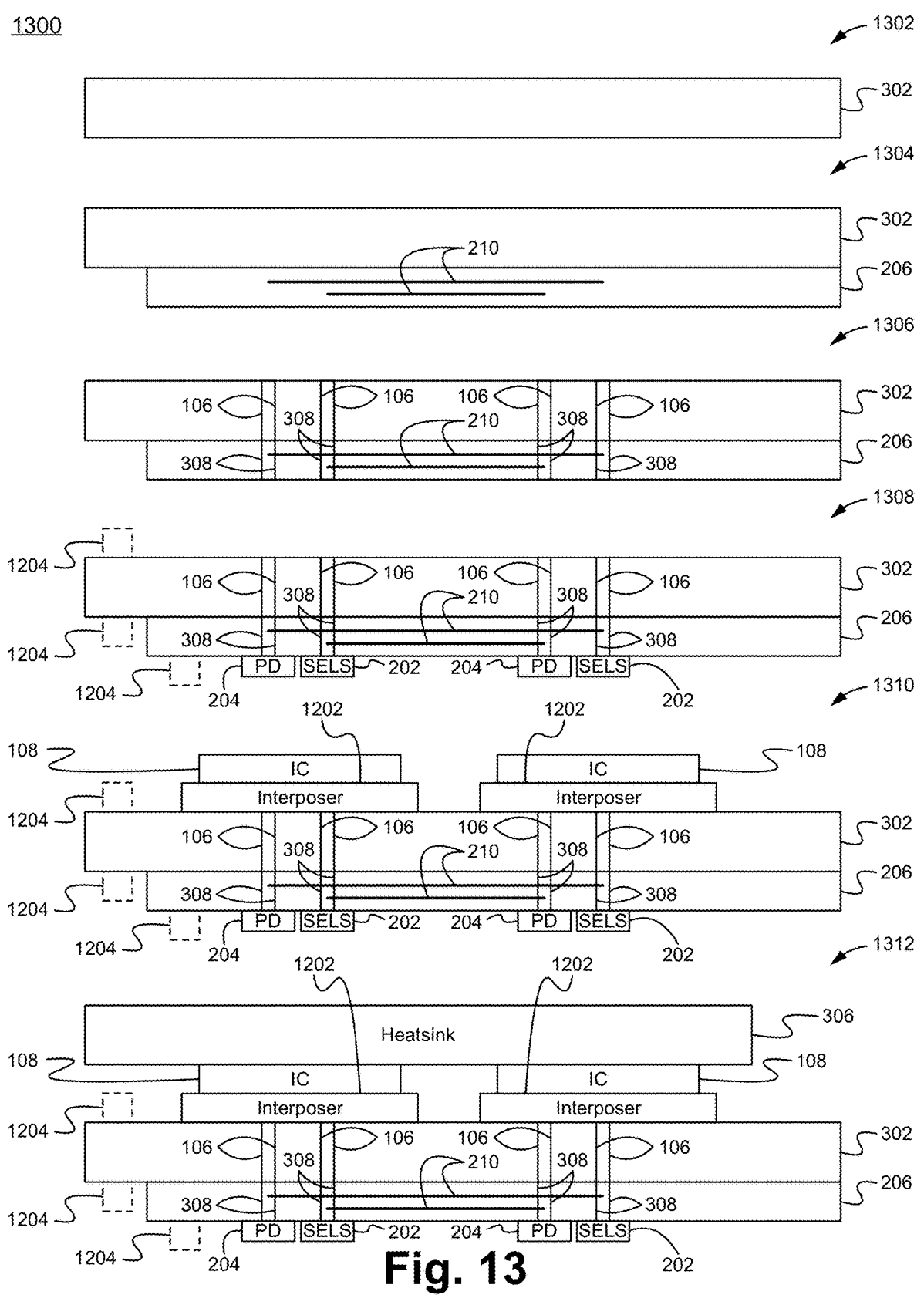
FIG. 13 illustrates a process of manufacturing the optical-electrical integrated circuit system having a backside optical interposer configuration according to some embodiments.

FIG. 13 illustrates a process 1300 of manufacturing the optical-electrical integrated circuit system 100"" having a backside optical interposer configuration according to some embodiments. As shown in FIG. 13, the substrate 302 is provided at the step 1302. As described above, the substrate 302 is able to include an integrated electrical network 106 for coupling with electrical components and/or transmitting electrical signals between different locations on the substrate 302 (including vias through the substrate 302). The waveguide network 206 is formed on the bottom surface of the substrate 302 at the step 1304. In particular, the optical paths 210, optical couplers 208, cladding 804 and/or other passive components are able to be patterned onto the bottom surface of the substrate 302 in one or more layers. The forming is able to comprise deposition (e.g. when the waveguide paths are dielectric), spinning (e.g. when the optical paths are polymer) and/or other manners of forming waveguide networks 206. In some embodiments, after the waveguide network 206 is formed, the process 1300 is able to further comprise etching or otherwise removing portions of the waveguide network 206 (e.g. in areas where there is no optical path 210, coupler 208 or other passive component) in order to expose portions of the substrate 302 such that components 1204 are able to be coupled thereto. Alternatively, the waveguide network 206 is able to only be formed on portions of the bottom surface of the substrate 302 excluding areas where exposure of the substrate 302 is desired.

The vias 308 are formed within the waveguide network 206 at the step 1306. For example, paths through the waveguide network 206 to the bottom surface of the substrate 302 are able to be patterned, etched and then filled with metal in order to form the vias 308. In particular, the vias 308 are able to be formed such that they are accessibly and able to be electrically coupled with on the bottom of the waveguide network 206 and such that they extend to and electrically couple with the electrical network 106 on the bottom surface of the substrate 302 (which includes substrate vias that extend to the top surface of the substrate 302 for electrically coupling with the interposers 1202 and/or components 1204). Alternatively, the forming of the vias 308 is able to include patterning, etching and filling with metal, paths that extend through both the waveguide network 206 and the substrate 302. Also, electrical coupling bumps and/or pads are able to be deposited on the exposed portions of the vias 308 to facilitate electrical coupling with the vias 308.

In some embodiments, the process 1300 further comprises forming alignment fiducials on the bottom of the waveguide network 206, wherein the fiducials visually indicate where to position/couple the SELS 202 and/or photodetectors 204 to the bottom of the waveguide network 206 in order to facilitate the electrical coupling of the SELS 202 and/or photodetectors 204 to the vias 308 (or the pads/bumps coupled thereto) and the optical coupling of the SELS 202 and/or photodetectors 204 with the optical couplers 208 within the network 206. Additionally, in some embodiments the process 1300 further comprises forming contact pads, traces, bumps or other electrically conductive elements on the top surface of the substrate 302 and/or on the exposed areas of the bottom surface of the substrate 302 for coupling with one or more of the electronic components 1204.

The SELS 202 and photodetectors 204 are coupled/bonded to the bottom of the waveguide network 206 at the step 1308. In particular, as described above, the SELS 202 and photodetectors 204 are electrically coupled with the vias 308 and optically coupled with the optical couplers 208 of the waveguide network 206 such that they are able to transmit and/or receive electrical signals with the ICs 108 (e.g. through the vias 308, electrical network 106 and the interposers 1202) and transmit and/or receive optical signals with the optical couplers 208. As described above, in some embodiments coupling of the SELS 202 and/or photodetectors 204 is able to include aligning them with and/or based on the alignment fiducials on the bottom of the waveguide network 206. Additionally, after the vias 308 have been formed, in some embodiments one or more components 1204 are able to similarly be electrically coupled to one or more of the vias 308 of the bottom of the waveguide network 206 and/or contacts of the electrical network 106 on the top surface of the substrate 302. Further, in some embodiments wherein one or more areas of the substrate 302 are exposed, the process 1300 further comprises electrically and/or physically coupling one or more of the components 1204 to the exposed areas on the bottom surface of the substrate 302. For example, the components 1204 are able to be electrically coupled to the electrical network 106 on the bottom surface of the substrate 302.

The interposers 1202 are electrically coupled to the electrical network 106 on the top surface of the substrate 302 and the ICs 108 are electrically coupled to the top of the interposers 1202 at the step 1310. In particular, each of the ICs 108 is able to be electrically coupled (e.g. via a micro ball grid) to electrical contacts on the top of a different one of the interposers 1202, which are able to be electrically coupled with each of the SELS 202 and/or photodetectors 204 through the electrical network 106 (within and on the substrate 302) and the vias 308 of the waveguide network 206. As a result, each of the ICs 108 are able to be electrically coupled with an SELS/photodetector pair 202/204 such that they are able to exchange electrical signals through the interposers 1202, electrical network 106 (of the substrate 302) and vias 208 of the waveguide network 206. In this manner, each of the ICs 108 are able to transmit signals through and receive signals from the waveguide network 206 via the SELS/photodetector pair 202/204 electrically coupled with that IC 108. Similarly, the ICs 108 are able to be electrically coupled with one or more of the components 1204 via the interposers 1202 and electrical network 106.

Finally, the heatsink 306 is coupled to the top of the ICs 108 at the step 1312. Alternatively, the heatsink 306 is able to be omitted. In some embodiments, the process 1300 further comprises testing the electrical and/or optical connections of the system 100"" before the interposers 1202 and/or the ICs 108 are coupled to the substrate 302. For example, each of the optical couplers 108, optical paths 210, components 1204, SELS 202 and/or photodetectors 204 are able to be tested to determine if they are correctly optically and/or electrically coupled together and operating as desired. Similarly, in some embodiments the process 1300 further comprises testing the electrical and/or optical connections of the system 100"''" after the interposers 1202 and/or the ICs 108 are coupled to the substrate 302. For example, each of the ICs 108 and/or interposers 1202 are able to be tested to determine if they are correctly electrically coupled together and operating as desired.

Thus, the process 1300 provides the advantage of creating high speed direct current electrical connections between SELS/photodetectors and the ICs 108 through the substrate 302. As a result, there is only a finite penalty from transferring signals from the ICs 108 and/or electrical components 1204 on the top surface of the substrate 302 to the SELS/photodetectors on the bottom. In particular, by utilizing the optical architecture on the backside of the substrate 302, the system enables high speed input/output from anywhere on the ICs 108 thereby increasing total input/output bandwidth of the ICs 108.

Figures 14A, 14B, 14C:
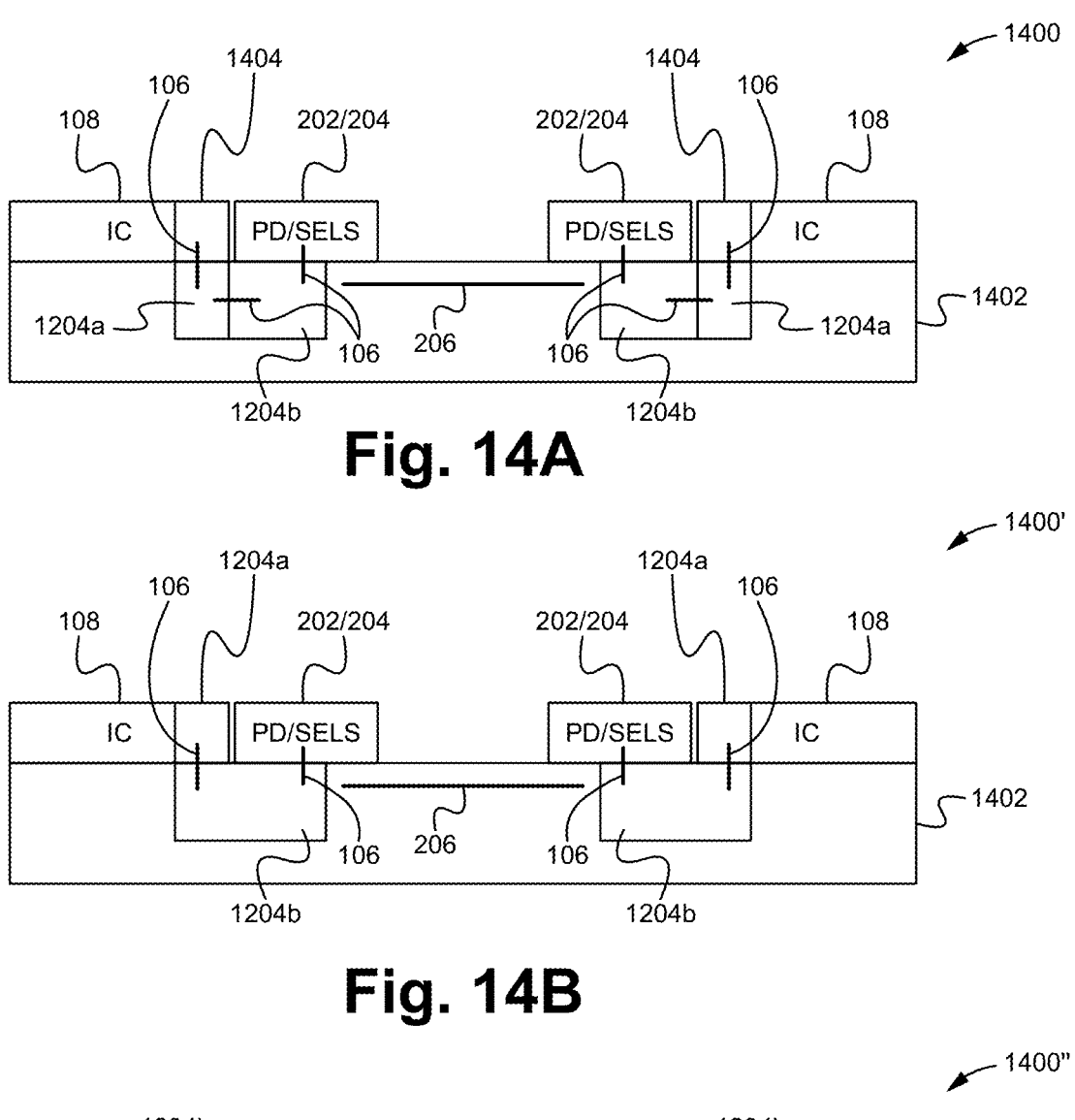
FIG. 14A illustrates a side cross-section block view of a fully embedded wafer level optical-electrical integrated circuit system according to some embodiments.
FIG. 14B illustrates a side cross-section block view of a partially embedded wafer level optical-electrical integrated circuit system according to some embodiments.
FIG. 14C illustrates a side cross-section block view of a photonics embedded wafer level optical-electrical integrated circuit system according to some embodiments.

FIG. 14A illustrates a side cross-section block view of a fully embedded wafer level optical-electrical integrated circuit system 1400 according to some embodiments. As shown in FIG. 14A, the system 1400 comprises a wafer 1402, the waveguide network 206, one or more ICs 108, one or more pairs of SELS 202 and photodetectors 204, the electrical network 106 and one or more electrical components 1204a, 1204b. The wafer 1402 is able to be a silicon wafer. In particular, the wafer 1402 is able to be a silicon photonic wafer. In some embodiments, the wafer 1402 is an active photonic wafer (e.g. including active electronic components) having the optical routing with reticle stitching capability. As described above, the reticle stitching is able to be optional for both active and passive optical interposer embodiments. The waveguide network 206 is formed into the wafer 1402 along with one or more electrical components 1204a, 1204b. The ICs 108, SELS 202 and photodetectors 204 are coupled to the top of the wafer 1402. Like in FIG. 3, the SELS and/or photodetectors 202, 204 are electrically coupled with the ICs 108 (via the electrical network 106) and optically coupled with the waveguide network 206 (via the optical couplers 208 (not shown)). Alternatively, instead of being coupled to the top of the wafer 1402, the photodetectors 204 are able to be integrated into the wafer 1402, wherein each of the photodetectors 204 are still in optical communication with one of the optical couplers 208 and electrically coupled with one of the ICs 108 via one or more of the electrical components 1204b and/or the network 106.

Further, the electrical components 1204a, 1204b are able to be coupled between the ICs 108 and the SELS/photodetectors 202, 204 via the network 106 for receiving/transmitting and/or modifying electrical signals between the ICs 108 and the SELS/photodetectors 202, 204. For example, the electrical components 1204a are able to be electrical transmitters/receivers (e.g. phy IP, SERDES) and/or the electrical components 1204b are able to be drivers and/or transimpedance amplifiers that together are able to enable the ICs 108 to drive/control the SELS 202 and receive electrical signals from the photodetectors 204. In particular, the electrical components 1204b (e.g. transimpedance amplifiers) are able to amplify or boost the electrical signal (e.g. current, voltage, etc.) generated by the photodetectors 204 based on the received optical signal, and then transmit the amplified electrical signal to the ICs 108. Similarly, the electrical components 1204 (e.g. drivers) are able to receive electrical signals (e.g. control signals) from the ICs and drive the SELS 202 to output the desired optical signal based on the received electrical signals. In some embodiments, the ICs 108 are able to include an interface 1404 for communicating/controlling the electrical components 1204a. As shown in FIG. 14A, because the components 1204a, 1204b and waveguide network 206 are formed within the wafer 1402, the waver 1402 is active. This provides the advantage of minimizing the amount of space required for the system 1400. It should be noted that although described with reference to FIGS. 14A-14C for the sake of brevity, the electrical components 1204a, 1204b described above are able to be incorporated into each of the systems described herein (e.g. electrically coupled between the ICs 108 and the SELS/photodetectors 202, 204 of the systems via the network 106 for receiving/transmitting and/or modifying electrical signals between the ICs 108 and the SELS/photodetectors 202, 204).

FIG. 14B illustrates a side cross-section block view of a partially embedded wafer level optical-electrical integrated circuit system 1400' according to some embodiments. The system 1400' is able to be substantially the same as the system 1400 of FIG. 14A except for the differences described herein. Specifically, as shown in FIG. 14B, the electrical components 1204a are positioned on top of the wafer 1402 instead of within the wafer 1402. In such embodiments, the electrical components 1204a are able to be coupled to the ICs 108 on the surface of the wafer 1402 (via the network 106) or incorporated into the ICs 108 themselves.

FIG. 14C illustrates a side cross-section block view of a photonics embedded wafer level optical-electrical integrated circuit system 1400" according to some embodiments. The system 1400" is able to be substantially the same as the system 1400 of FIG. 14A except for the differences described herein. Specifically, as shown in FIG. 14C, both the electrical components 1204a and 1204b are positioned on top of the wafer 1402 instead of within the wafer 1402 such that the wafer 1402 only includes the waveguide network 206. In particular, this embodiment is able to be used when the foundry is unable to include active electronics within the wafer 1402.

The optical interconnect system, method and device described herein provides numerous advantages. Specifically, the system, method and device provide the advantage of enabling the vertical optical signal coupling of the optical signal 99 output by the SELS 202 with the optical couplers 208 of the waveguide network 206, which then are able to transmit the signal 99 to another location in the network 206 in a direction perpendicular to the direction of the vertical optical signal coupling. As a result, footprint/spacing issues for the SELS 202 and/or the ICs 108 are reduced. Indeed, the optical interconnect system, method and device enables both the optical architecture and the electronic architecture to be integrated on the same printed circuit board (and/or other substrate) thereby lessening the need for external optical interconnects. Further, the system, method and device have the advantage of providing flexible connectivity topologies that are impossible using solely electrical connectivity methods due to their need for close proximity of components. Similarly, it provides the benefit of enabling different ICs to have larger spacing between each other such that ICs having different heating, power, and/or other desired parameters can be better grouped and/or spaced from each other. For example, a memory IC is able to have lower heat dissipation requirements than other types of ICs and so can be positioned away from the other ICs without sacrificing significant latency due to the optical interconnect system. In other words, by lessening the need for close proximity the optical interconnect system, method and device lessens hardware density issues (e.g. power, heat, space) by using optical networks to extend electrical endpoints and enabling wafer and/or panel level optical interconnection.

While the system, method and device has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details. In particular, it should be noted that although not described in detail for the sake of brevity, each of the systems 100, 100', 100", 100''', 100'''' are able to comprise electrical signal amplifiers (e.g. transimpedance amplifiers) electrically coupled with the photodetectors 204 and/or drivers electrically coupled with the SELS 202. In particular, the amplifiers are able to amplify electrical signals produced by the photodetectors 202 before they are received by the ICs 108. Further, the drivers are able to receive electrical signals (e.g. commands, messages, etc.) from the ICs 108 and drive the SELS 202 to output corresponding optical signals based on the electrical signals. Thus, in such embodiments the amplifiers and/or drivers are able to be a part of the electrical network 106 electrically coupling the ICs 108 with the photodetectors 204 and SELS 202. Each system is able to comprise a separate driver for each of the SELS 202 and/or a separate amplifier for each of the photodetectors 204. Alternatively, a plurality of the SELS 202 are able to share a driver and/or a plurality of the photodetectors 204 are able to share an amplifier. In some embodiments, the drivers and/or amplifiers are positioned on the surface of one or more of the substrates 302, 304 and/or the waveguide network 206. Alternatively, one or more of the drivers and/or amplifiers are able to be embedded within one of the substrates 302, 304 and/or waveguide network 206. Accordingly, for each system 100, 100', 100", 100''', 100'''' described above, for each set of a SELS 202, a photodetector 204, a driver (of that SELS 202), and an amplifier (of that photodetector 204): all of the set are able to be coupled to the surface of one or more the substrates 302, 304 and/or the waveguide network 206; the SELS 202 of the set is able to be coupled to the surface with the remainder of the set embedded within the one or more the substrates 302, 304 and/or the waveguide network 206; or the photodetector 204 and the SELS 202 of the set is able to be coupled to the surface with the remainder of the set embedded within the one or more the substrates 302, 304 and/or the waveguide network 206. Additionally, the components of the SELS 202, the photodetectors 204, the electrical architecture 104, the electrical network 106 and/or the ICs 108 are able to include one or more of a network interface, a memory, a processor, I/O device(s), a bus and a storage device. The memory is able to be any conventional computer memory known in the art. The storage device is able to include a hard drive, RAM, SRAM, CDROM, CDRW, DVD, DVDRW, flash memory card or any other storage device. An example of a network interface includes a network card connected to an Ethernet or other type of LAN. The I/O device(s) are able to include one or more of the following: keyboard, mouse, monitor, display, printer, modem, touchscreen, button interface and other devices. The operating system(s), graphical user interface(s), application(s), module(s) and/or other software (if any) used to operate the SELS 202, the photodetectors 204, the electrical architecture 104, the electrical network 106 and/or the ICs 108 are likely to be stored in the memory and/or storage device and processed as applications are typically processed via the processor.

I claim:

1. An integrated circuit system, the system comprising:
   a package substrate providing structural support to the system;
   a plurality of application specific integrated circuits (ASICs);
   a plurality of surface emitting light sources (SELS);
   a plurality of photodetectors, wherein each of the ASICs is electrically coupled with at least one of the SELS and at least one of the photodetectors for transmitting and receiving electrical signals to the at least one of the SELS and from the at least one of the photodetectors; and
   a waveguide network including a plurality of waveguide paths that each optically guide light between a first end of the path a second end of the path, wherein each of the first ends is optically coupled with a different one of the SELS for receiving an optical signal from the different one of the SELS and each of the second ends is optically coupled with a different one of the photodetectors for transmitting the optical signal to the different one of the photodetectors.

2. The system of claim 1, wherein the SELS convert the electrical signals received from the ASICs to the optical signals transmitted to the first ends and the photodetectors convert the optical signals received from the second ends to the electrical signals transmitted to the ASICs.

3. The system of claim 1, wherein the SELS comprise one or more of micro light emitting diodes and vertical cavity surface emitting lasers.

4. The system of claim 1, wherein the photodetectors are normal incident photodetectors.

5. The system of claim 1, wherein the waveguide network is formed by one of silicon nitride and a polymer.

6. The system of claim 1, wherein the waveguide network comprises a plurality of horizontal layers that each include a plurality of the waveguide paths extending from one location in the layer proximate one of the ASICs to another location within the layer proximate another of the ASICs.

7. The system of claim 1, wherein the first ends and the second ends of the waveguide paths each comprise one of a group consisting of a grating coupler and a 45 degree mirror for receiving the optical signal into and transmitting the optical signal out of the waveguide path.

8. The system of claim 1, wherein the optical signal is multimodal, further comprising one or more polarization filters positioned between each of the first ends and the different one of the SELS optically coupled with the first end for filtering the optical signals output by the SELS before the optical signals are received by the first ends.

9. The system of claim 1, wherein the optical signal is multimodal and the waveguide network is multimodal for transporting each mode of the optical signals.

10. The system of claim 1, wherein an additional substrate is formed on the package substrate, the waveguide network is formed on top of the additional substrate and the ASICs, photodetectors and SELS are coupled to a top of the waveguide network via a flip chip type coupling.

11. The system of claim 1, wherein the waveguide network is formed on top of the package substrate, the photodetectors and SELS are positioned within the waveguide network adjacent to the package substrate and the ASICs are coupled to a top of the waveguide network opposite the package substrate.

12. The system of claim 1, wherein the waveguide network is formed on top of the package substrate, the ASICs are positioned within the waveguide network adjacent to the package substrate and the photodetectors and the SELS are coupled to a top of the waveguide network opposite the package substrate.

13. The system of claim 1, wherein the ASICs are positioned on top of the package substrate, the photodetectors and the SELS are positioned on top of the ASICs and the waveguide network is positioned proximate the photodetectors and the SELS opposite the top of the ASICs, and further wherein there is a gap between the waveguide network and the photodetectors and the SELS.

14. An optical interconnect comprising:
a plurality of application specific integrated circuits (ASICs);
a plurality of surface emitting light sources (SELS);
a plurality of photodetectors, wherein each of the ASICs is electrically coupled with at least one of the SELS and at least one of the photodetectors for transmitting and receiving electrical signals to the at least one of the SELS and from the at least one of the photodetectors; and
a waveguide network including a plurality of waveguide paths that each optically guide light between a first end of the path a second end of the path, wherein each of the first ends is optically coupled with a different one of the SELS for receiving an optical signal from the different one of the SELS and each of the second ends is optically coupled with a different one of the photo-detectors for transmitting the optical signal to the different one of the photodetectors.

15. The optical interconnect of claim 14, wherein the SELS convert the electrical signals received from the ASICs to the optical signals transmitted to the first ends and the photodetectors convert the optical signals received from the second ends to the electrical signals transmitted to the ASICs.

16. The optical interconnect of claim 1, wherein the SELS comprise one or more of micro light emitting diodes and vertical cavity surface emitting lasers.

17. The optical interconnect of claim 14, wherein the photodetectors are normal incident photodetectors.

18. The optical interconnect of claim 14, wherein the waveguide network is formed by one of silicon nitride and a polymer.

19. The optical interconnect of claim 14, wherein the waveguide network comprises a plurality of horizontal layers that each include a plurality of the waveguide paths extending from one location in the layer proximate one of the ASICs to another location within the layer proximate another of the ASICs.

20. The optical interconnect of claim 14, wherein the first ends and the second ends of the waveguide paths each comprise one of a group consisting of a grating coupler and a 45 degree mirror for receiving the optical signal into and transmitting the optical signal out of the waveguide path.

21. The optical interconnect of claim 14, wherein the optical signal is multimodal, further comprising one or more polarization filters positioned between each of the first ends and the different one of the SELS optically coupled with the first end for filtering the optical signals output by the SELS before the optical signals are received by the first ends.

22. The optical interconnect of claim 14, wherein the optical signal is multimodal and the waveguide network is multimodal for transporting each mode of the optical signals.

23. The optical interconnect of claim 14, wherein the ASICs, photodetectors and SELS are coupled to a top of the waveguide network via a flip chip type coupling.

24. The optical interconnect of claim 14, wherein the photodetectors and SELS are positioned within the waveguide network abutting a bottom of the waveguide network and the ASICs are coupled to a top of the waveguide network opposite the bottom.

25. The optical interconnect of claim 14, wherein the ASICs are positioned within the waveguide network abutting a bottom of the waveguide network and the photodetectors and the SELS are coupled to a top of the waveguide network opposite the bottom.

26. The optical interconnect of claim 14, wherein the photodetectors and the SELS are positioned on top of the ASICs, the waveguide network is positioned proximate the photodetectors and the SELS opposite the top of the ASICs, and there is a gap between the waveguide network and the photodetectors and the SELS.

27. A method of implementing an integrated circuit system, the method comprising:
providing a package substrate;
electrically coupling each of a plurality of application specific integrated circuits (ASICs) with at least one of a plurality of surface emitting light sources (SELS) for transmitting electrical signals to the at least one of the SELS;
electrically coupling each of the plurality of ASICs with at least one of a plurality of photodetectors for receiving the electrical signals from the at least one of the photodetectors;
providing a waveguide network including a plurality of waveguide paths that each optically guide light between a first end of the path a second end of the path;
optically coupling each of the first ends with a different one of the SELS for receiving an optical signal from the different one of the SELS; and
optically coupling each of the second ends with a different one of the photodetectors for transmitting the optical signal to the different one of the photodetectors.

28. The method of claim 27, further comprising:
converting the electrical signals received from the ASICs to the optical signals transmitted to the first ends with the SELS; and
converting the optical signals received from the second ends to the electrical signals transmitted to the ASICs with the photodetectors.

29. The method of claim 27, wherein the SELS comprise one or more of micro light emitting diodes and vertical cavity surface emitting lasers.

30. The method of claim 27, wherein the photodetectors are normal incident photodetectors.

31. The method of claim 27, wherein the waveguide network is formed by one of silicon nitride and a polymer.

32. The method of claim 27, wherein the waveguide network comprises a plurality of horizontal layers that each include a plurality of the waveguide paths extending from one location in the layer proximate one of the ASICs to another location within the layer proximate another of the ASICs.

33. The method of claim 27, wherein the first ends and the second ends of the waveguide paths each comprise one of a group consisting of a grating coupler and a 45 degree mirror for receiving the optical signal into and transmitting the optical signal out of the waveguide path.

34. The method of claim 27, wherein the optical signal is multimodal, further comprising filtering the optical signals output by the SELS before the optical signals are received by the first ends by positioning one or more polarization filters between each of the first ends and the different one of the SELS optically coupled with the first end.

35. The method of claim 27, wherein the optical signal is multimodal and the waveguide network is multimodal for transporting each mode of the optical signals.

36. The method of claim 27, further comprising:

forming an additional substrate on the package substrate;

forming the waveguide network on top of the additional substrate; and coupling the ASICs, photodetectors and SELS to a top of the waveguide network via a flip chip type coupling.

37. The method of claim 27, further comprising:

forming the waveguide network on top of the package substrate;

positioning the photodetectors and SELS within the waveguide network adjacent to the package substrate; and coupling the ASICs to a top of the waveguide network opposite the package substrate.

38. The method of claim 27, further comprising:

forming the waveguide network on top of the package substrate;

positioning the ASICs within the waveguide network adjacent to the package substrate; and coupling the photodetectors and the SELS to a top of the waveguide network opposite the package substrate.

39. The method of claim 27, further comprising:

positioning the ASICs on top of the package substrate;

positioning the photodetectors and the SELS on top of the ASICs; and positioning the waveguide network proximate the photodetectors and the SELS opposite the top of the ASICs such that there is a gap between the waveguide network and the photodetectors and the SELS.

* * * * *